(12) United States Patent
Kale et al.

(10) Patent No.: US 12,535,388 B2
(45) Date of Patent: Jan. 27, 2026

(54) APPARATUS, METHOD AND SYSTEM FOR ASSESSING FIELD CONDITIONS

(71) Applicant: DEERE & COMPANY, Moline, IL (US)

(72) Inventors: Mandar M. Kale, Pune (IN); Rahul G. Gunda, Pune (IN); Dipankar D. Dongare, Dombivali (IN)

(73) Assignee: Deere & Company, Moline, IL (US)

( * ) Notice: Subject to any disclaimer, the term of this patent is extended or adjusted under 35 U.S.C. 154(b) by 501 days.

(21) Appl. No.: 18/047,711

(22) Filed: Oct. 19, 2022

(65) Prior Publication Data

US 2023/0135150 A1  May 4, 2023

Related U.S. Application Data

(60) Provisional application No. 63/263,291, filed on Oct. 29, 2021.

(51) Int. Cl.
*G01M 17/03* (2006.01)
*G01N 33/24* (2006.01)

(52) U.S. Cl.
CPC .......... *G01M 17/03* (2013.01); *G01N 33/246* (2013.01)

(58) Field of Classification Search
CPC ............................. G01M 17/03; G01N 33/246
See application file for complete search history.

(56) References Cited

U.S. PATENT DOCUMENTS

| | | | |
|---|---|---|---|
| 6,041,582 A | 3/2000 | Tiede et al. | |
| 6,236,924 B1 | 5/2001 | Motz et al. | |
| 6,505,146 B1 | 1/2003 | Blackmer | |
| 7,313,478 B1 | 12/2007 | Anderson et al. | |

(Continued)

FOREIGN PATENT DOCUMENTS

| | | |
|---|---|---|
| CN | 202953175 U | 5/2013 |
| CN | 204507277 U | 7/2015 |

(Continued)

OTHER PUBLICATIONS

Autonomous Takeoff, Tracking and Landing of an UAV on a Moving UGV Using Onboard Monocular Vision, uploaded on Jan. 16, 2014, pp. 1-3. Retrieved from the Youtube <URL: https://www.youtube.com/watch?v=lakP1EMtl1w>.

(Continued)

*Primary Examiner* — Xin Y Zhong
(74) *Attorney, Agent, or Firm* — Hanley, Flight & Zimmerman, LLC

(57) ABSTRACT

One or more techniques and/or systems are disclosed for identifying field conditions of a field. Site conditions of a target site affecting machine sink can be identified using real-time or historical data. Soil conditions, weather conditions, moisture levels, and other factors may be used to determine whether a target site may result in machine sink of a target piece of equipment. The machine sink information can be identified for a target area, that comprises a target site, and a machine sink map can be generated for the site. Target equipment specifications can be used to determine whether the target equipment may effectively traverse the target site based on the machine sink map. Further, a travel path may be generated for a piece of target equipment based on the machine sink map, site conditions, and the equipment specifications.

20 Claims, 17 Drawing Sheets

(56) References Cited

U.S. PATENT DOCUMENTS

| | | |
|---|---|---|
| 7,610,122 B2 | 10/2009 | Anderson |
| 7,957,850 B2 | 6/2011 | Anderson |
| 8,079,433 B2 | 12/2011 | Teague et al. |
| 8,195,342 B2 | 6/2012 | Anderson |
| 8,234,010 B2 | 7/2012 | Thompson et al. |
| 8,325,025 B2 | 12/2012 | Morgan et al. |
| 8,442,700 B2 | 5/2013 | Anderson |
| 8,494,727 B2 | 7/2013 | Green et al. |
| 8,560,145 B2 | 10/2013 | Anderson |
| 8,843,269 B2 | 9/2014 | Anderson et al. |
| 9,056,676 B1 | 6/2015 | Wang |
| 9,066,464 B2 | 6/2015 | Schmidt et al. |
| 9,066,465 B2 | 6/2015 | Hendrickson et al. |
| 9,188,518 B2 | 11/2015 | Snyder et al. |
| 9,234,317 B2 | 1/2016 | Chi |
| 9,439,342 B2 | 9/2016 | Pasquier |
| 9,489,576 B2 | 11/2016 | Johnson et al. |
| 9,511,633 B2 | 12/2016 | Anderson et al. |
| 10,569,875 B2 | 2/2020 | Flood et al. |
| 2002/0198654 A1 | 12/2002 | Lange et al. |
| 2003/0060938 A1 | 3/2003 | Duvall |
| 2005/0197175 A1 | 9/2005 | Anderson |
| 2006/0074560 A1 | 4/2006 | Dyer et al. |
| 2006/0196158 A1 | 9/2006 | Faivre et al. |
| 2006/0200334 A1 | 9/2006 | Faivre et al. |
| 2007/0068238 A1 | 3/2007 | Wendte |
| 2007/0239337 A1 | 10/2007 | Anderson |
| 2008/0140431 A1 | 6/2008 | Anderson et al. |
| 2009/0311084 A1 | 12/2009 | Coers et al. |
| 2010/0036696 A1 | 2/2010 | Lang et al. |
| 2010/0319941 A1 | 12/2010 | Peterson |
| 2011/0153338 A1 | 6/2011 | Anderson |
| 2014/0257911 A1 | 9/2014 | Anderson |
| 2014/0263852 A1 | 9/2014 | Walker et al. |
| 2015/0095830 A1 | 4/2015 | Massoumi et al. |
| 2015/0102154 A1 | 4/2015 | Duncan et al. |
| 2016/0247075 A1 | 8/2016 | Mewes et al. |
| 2016/0260021 A1 | 9/2016 | Marek |
| 2017/0192431 A1 | 7/2017 | Foster et al. |
| 2019/0094834 A1 | 3/2019 | Bramberger |
| 2019/0129435 A1* | 5/2019 | Madsen ............... B60K 35/00 |
| 2020/0000006 A1 | 1/2020 | Mcdonald et al. |
| 2020/0093054 A1 | 3/2020 | Aesaert et al. |

FOREIGN PATENT DOCUMENTS

| | | | |
|---|---|---|---|
| CN | 105205248 A | 12/2015 | |
| DE | 102018120741 A1 | 2/2020 | |
| EP | 2267566 A2 | 12/2010 | |
| EP | 2868806 B1 | 7/2016 | |
| EP | 3175691 A1 | 6/2017 | |
| EP | 2508057 B1 | 7/2018 | |
| GB | 201519517 A | 7/1978 | |
| JP | 2017144784 A | 8/2017 | |
| JP | 2018151388 A | 9/2018 | |
| RU | 2502047 C1 | 12/2013 | |
| WO | 2017077113 A1 | 5/2017 | |
| WO | 2018220159 A1 | 12/2018 | |

OTHER PUBLICATIONS

Boeing unmanned helicopter landing on moving trailer, uploaded on Nov. 19, 2011, pp. 1-4, Retrieved from the Youtube <URL: https://www.youtube.com/watch?v=llBtM8V7wsM>.

Yan Ma et al., Coordinated Landing and Mapping with Aerial and Ground Vehicle Teams, pp. 1-75. Retrieved from the Internet <URL: https://uwspace.uwaterloo.ca/bitstream/handle/10012/6993/Ma_Yan.pdf?sequence=1&isAllowed=y>.

Ground Penetrating Radar for Drone, pp. 1-9. Retrieved from the Internet <URL: https://integrated.ugcs.com/gpr??utm_source=ugcs.com&utm_medium=application&utm_campaign=redirect>.

Colin Jeffrey et al., Nesting platform takes smart drone capabilities to new heights, Feb. 17, 2016, pp. 1-12. Retrieved from the Internet <URL: https://newatlas.com/dronebox-remote-uav-nesting-platform/41850/>.

Matti Sirén et al., Predicting forwarder rut formation on fine-grained mineral soils, Scandinavian Journal of Forest Research, Nov. 27, 2018, pp. 145-154, DOI: 10.1080/02827581.2018.1562567. Retrieved from the Internet <URL: https://www.tandfonline.com/doi/pdf/10.1080/02827581.2018.1562567>.

SA-400 Jackal Autonomous Takeoff and Landing on a Moving Trailer, uploaded on Aug. 22, 2014, pp. 1-3. Retrieved from the Youtube <URL: https://www.youtube.com/watch?v=n__GBgTu3p0>.

Marie-France Jones et al., Soil Trafficability Forecasting, Open Journal of Forestry, Sep. 29, 2019, pp. 296-322, DOI: 10.4236/ojf.2019.94017. Retrieved from the Internet <URL: https://www.scirp.org/journal/paperinformation.aspx?paperid=95468>.

Submarines with a storage location for airplane, Wikipedia, pp. 1-7. Retrieved from the Internet <URL: https://en.wikipedia.org/wiki/Submarine_aircraft_carrier>.

Decentralized Control for UAV / UGV Landing, pp. 1-3, Retrieved from the Youtube <URL: https://www.youtube.com/watch?v=JRjJV_WLluA>.

What is Ground Penetrating Radar (GPR), pp. 1-9. Retrieved from the Internet <URL: https://www.sensoft.ca/blog/what-is-gpr/>.

* cited by examiner

APPARATUS, METHOD AND SYSTEM FOR ASSESSING FIELD CONDITIONS

CROSS-REFERENCE TO RELATED APPLICATION

This application claims the benefit of U.S. Provisional Application No. 63/263,291, filed Oct. 29, 2021, the contents of which are hereby incorporated in reference in their entirety.

FIELD OF THE DISCLOSURE

This disclosure relates to an apparatus, method and system for assessing field conditions for an agricultural operation.

BACKGROUND OF THE DISCLOSURE

Agricultural vehicles, such as tractors, combines, seeders, planters or sprayers are often massive in size and thus are susceptible to sinking and excessive compaction in certain field conditions. As these agricultural vehicles traverse a field during an agricultural operation, they may experience field conditions with relatively higher moisture content and/or loose soil—both of which exacerbate sinking and compaction of the agricultural vehicle. Without proper planning and precautions, such field conditions may cause the vehicle to get stuck or sink leading to damage to the field and the vehicle, including unnecessary downtime and loss of productivity.

SUMMARY OF THE DISCLOSURE

A system for identifying field conditions of a site by equipment, the system comprising: a field condition determination component using a processor to generate machine sink data based at least on: location data indicative of a location of a target site; and soil data indicative of soil conditions at the target site stored in memory; wherein the machine sink data is indicative of conditions at the target site related to machine sink at the target site; a machine sink map generation component generating a machine sink map for a target area comprising the target site based at least on: machine sink data received from the machine sink determination component; equipment identification data indicative of target equipment specifications for traversing the target site; and target area data indicative of a desired target area that comprises the target site; and one or more of: a machine sink management component used to manage machine sink of the target site, the machine sink management component receiving the machine sink map resulting in a determination of target site machine sink for the target equipment; and a display receiving the machine sink map to render a visual representation of the machine sink map of the target area viewable by an operator of the target equipment.

A method for controlling the actuation mechanisms of a plurality of components of an agricultural vehicle, the method comprising: determining a state vector comprising a plurality of state elements, each of the state elements representing a measurement a state of a subset of the components of the agricultural vehicle, each of the components controlled by an actuation control system communicatively coupled to a control system on the agricultural vehicle; inputting, using the computer, the state vector into a control model to generate an action vector comprising a plurality of action elements for the agricultural vehicle, each of the action elements specifying an action to be taken by the agricultural vehicle in the field, the actions, in aggregate, predicted to achieve improved performance for the agricultural vehicle; and actuating a subset of actuation controllers to execute the actions in the field on the action vector, the subset of actuation controllers changing a configuration of the subset of components such that the state of the agricultural vehicle changes.

The details of one or more examples are set forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
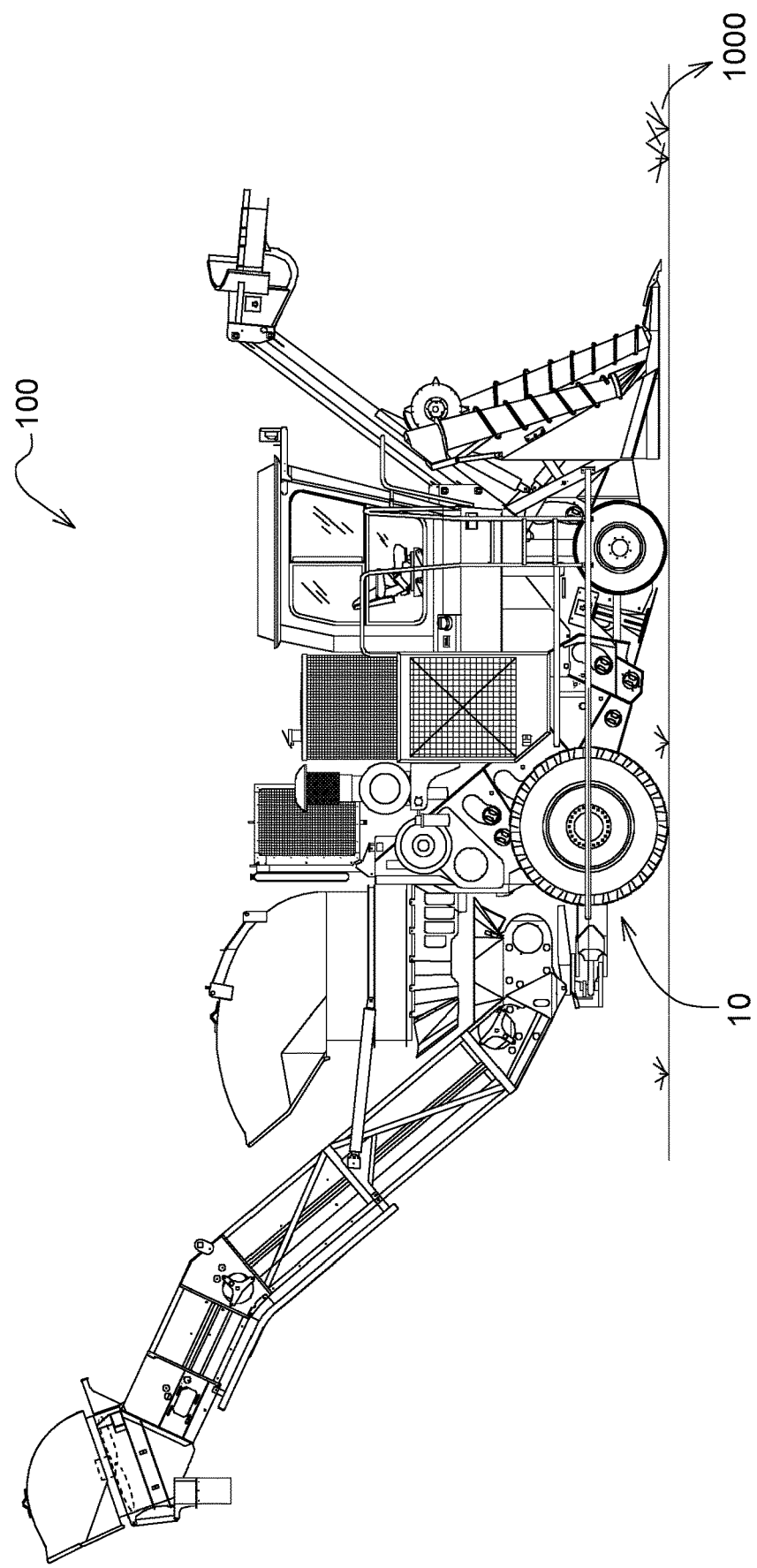
FIG. 1 is a partial pictorial, partial schematic, illustration of one example of an agricultural vehicle.

For simplicity and clarity of illustration, descriptions and details of well-known features and techniques may be omitted to avoid unnecessarily obscuring the example and non-limiting examples of the invention described in the subsequent Detailed Description. It should further be understood that features or elements appearing in the accompanying figures are not necessarily drawn to scale unless otherwise stated. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

DETAILED DESCRIPTION

Examples of the present disclosure are shown in the accompanying figures of the drawings described briefly above. Various modifications to the examples may be contemplated by one of skill in the art without departing from the scope of the present invention, as set-forth the appended claims.

A field condition system includes obtaining the ground conditions, predicting the areas with high probability of sinking of agricultural vehicle with the help of sensors, not limiting to, ground penetrating radar (GPR), weather and soil conditions, knowledge of vehicle parameters such as weight, quantity of commodities and/or fuel remaining, and providing this information to the operator and/or feed this information to automatic navigation system of the vehicles.

FIG. 1 illustrates an agricultural vehicle 100, such as for example, a tractor pulling an implement or, in the depiction, a sugarcane harvester performing a designated agricultural operation in a field 1000. However, the agricultural vehicle 100 can also include tractors, planters, sprayers and harvesters. For the sake of simplicity, the present invention mentions sugarcane harvester as one example. Sugarcane harvesters are massive in size and can harvest acres of land efficiently and—owing to their huge size and weight—are prone to creating compaction and machine sinking. Often, due to previous rains or prevailing soil/weather conditions, certain areas of a field 1000 experience field conditions that are undesirable for operation of large agricultural vehicles. These areas often have a certain type of soil, higher moisture content and generally undesirable terrain (low, wet spots) as compared to rest of the field 1000.

Figure 2:
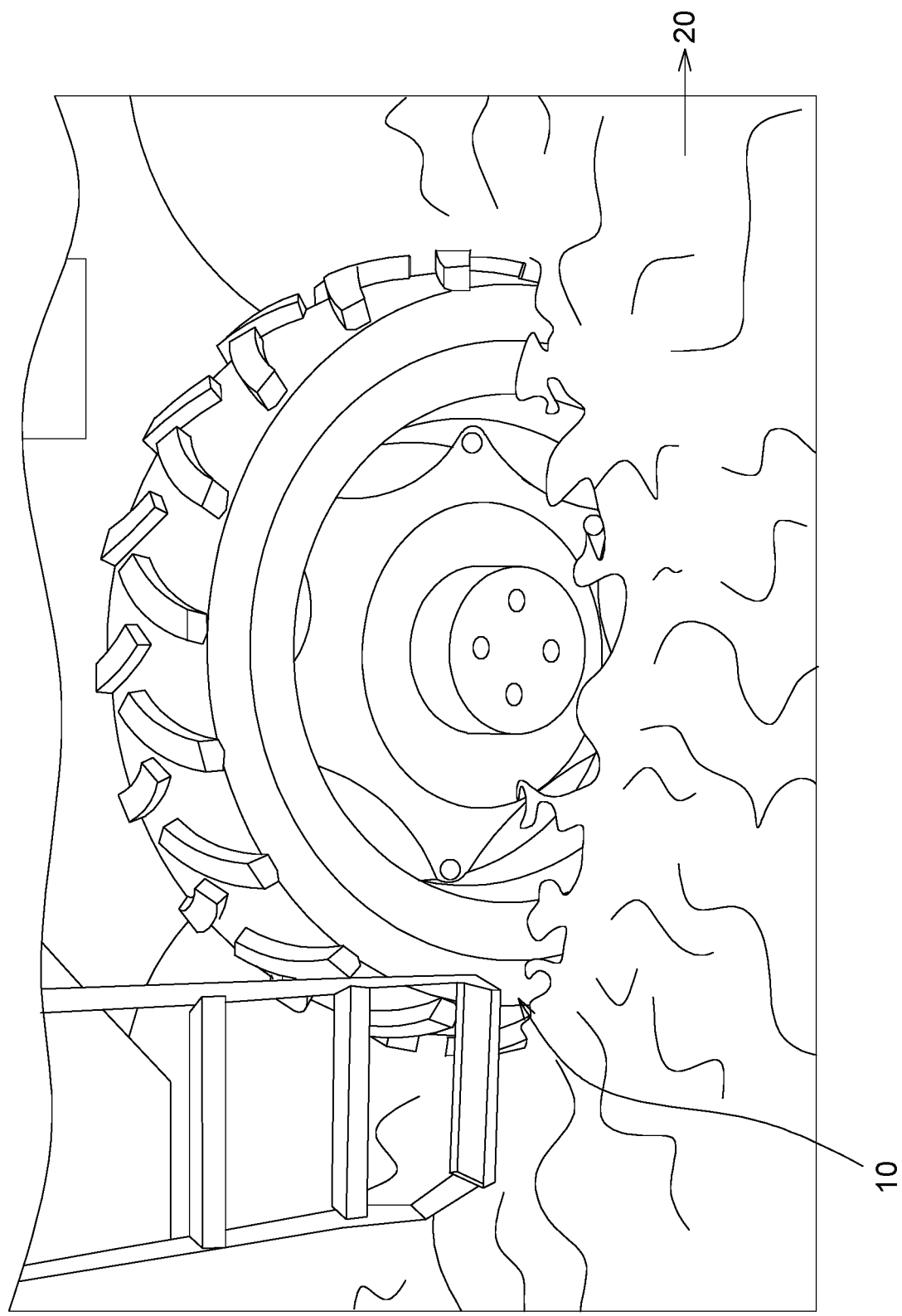
FIG. 2 illustrates one example of the wheel of an agricultural vehicle sinking in an area of the agricultural field with field conditions favoring machine sink.
Figure 3:
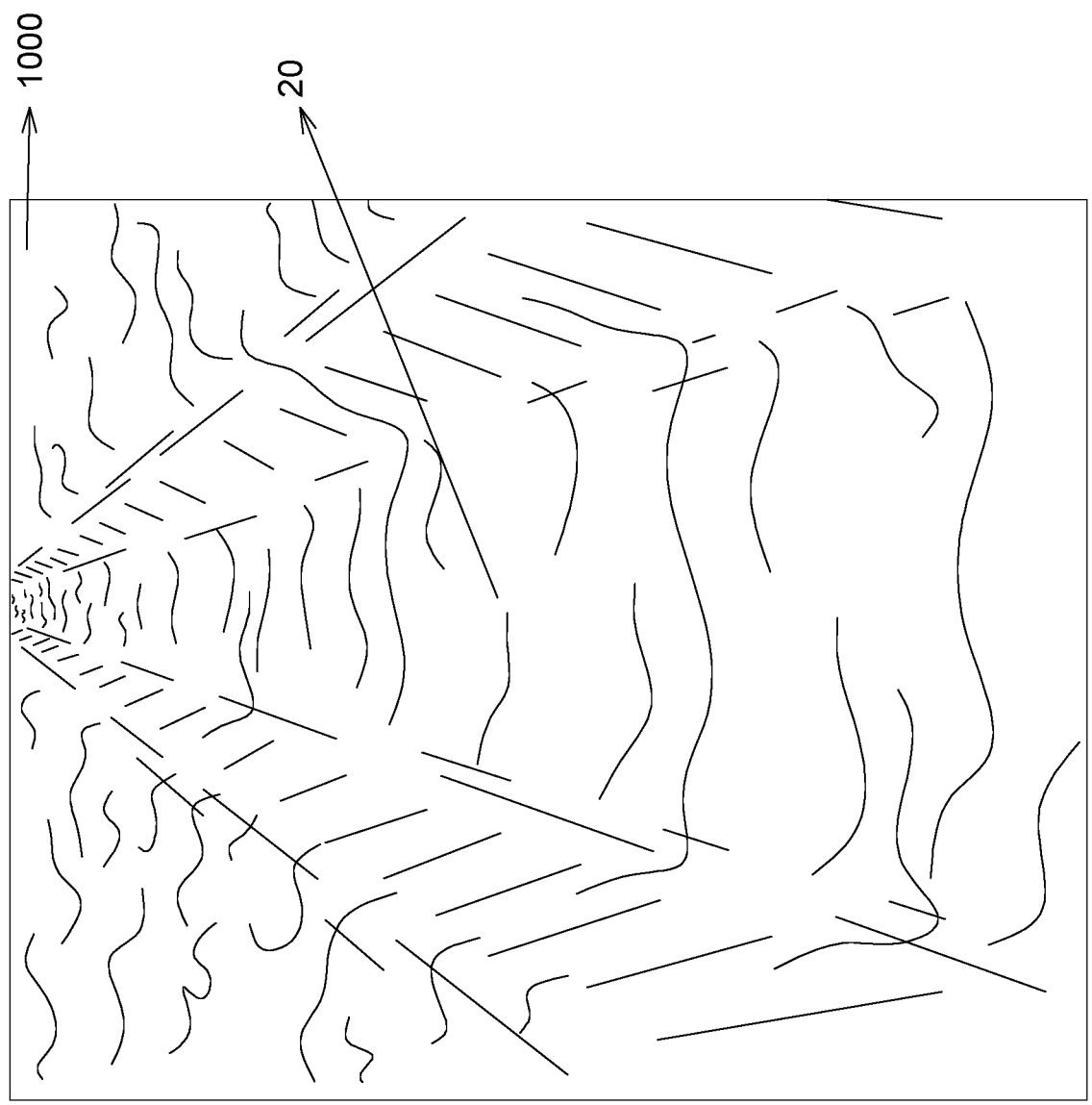
FIG. 3 is an illustration of excessive sinking of an agricultural vehicle sinking in an area of the agricultural field with field conditions favoring machine sink.

FIG. 2 illustrates the tires 10 of the sugarcane harvester 100 which has dramatically sunk in area 20 of the field 1000 with poor field conditions. When a harvester 100 sinks as depicted in FIG. 2, a powerful vehicle is required to tow out the harvester 100, thus creating a deep pit or trench formed in the affected area as indicated in FIG. 3. It follows then that machine sinking leads to loss of productivity, machine downtime and loss of important time windows in farming.

Figure 4:
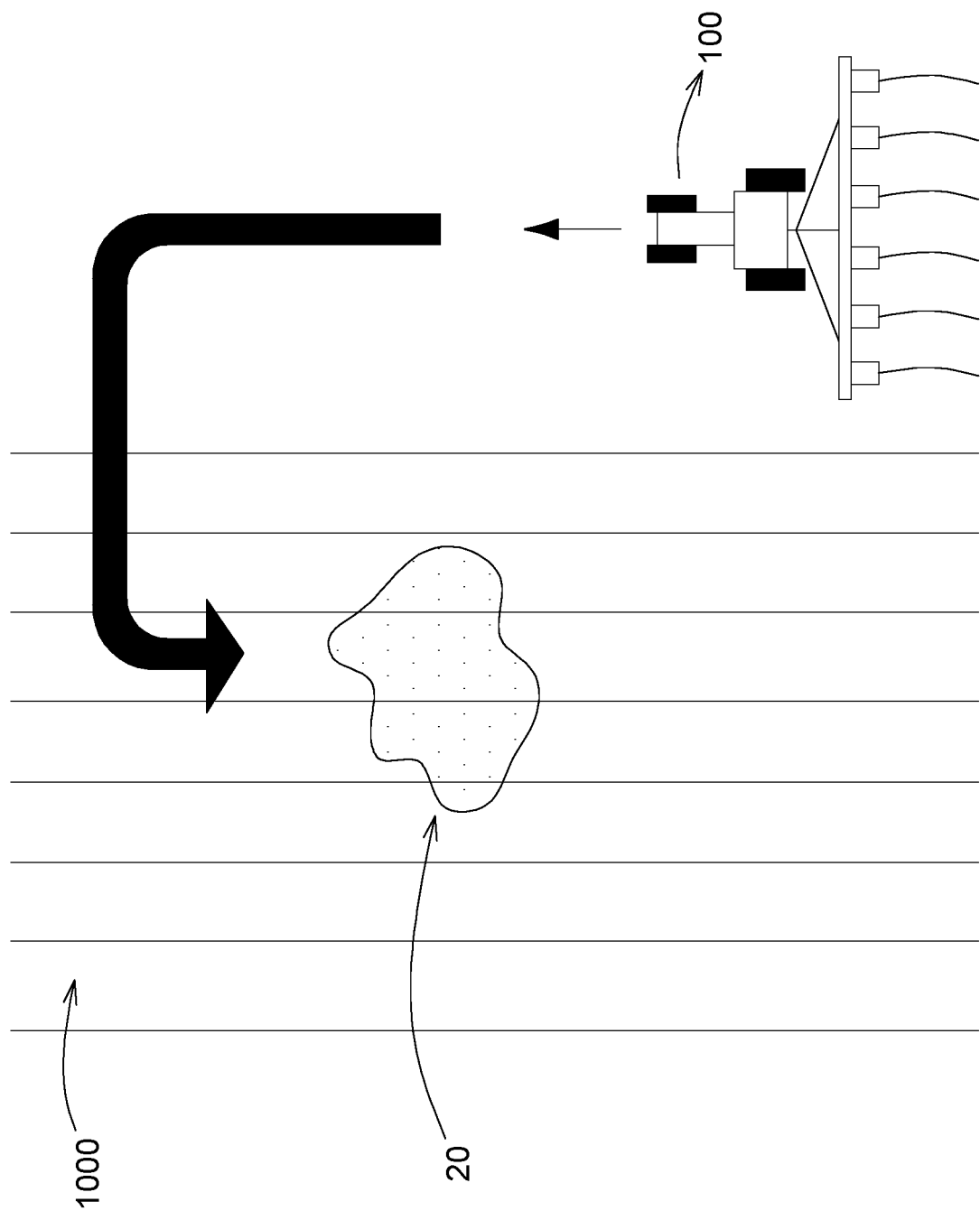
FIG. 4 is an example of sink area estimation.

The present disclosure predicts field conditions in advance as illustrated in FIG. 4. Although not limited to drone, but by various means like ground penetrating radar, other sensory and vehicle configuration inputs, knowledge of weather and historical soil conditions, information is processed, and the control system outputs prior estimation of sinkable areas. Thus, the present disclosure predicts poor field conditions and proactively plans around areas with poor field conditions including by providing one or more guidance paths around areas with poor field conditions.

In one aspect, a system can be devised that can identify field conditions for a target site, for target equipment. That is, for example, an example system may be able to identify when site conditions are amenable for a particular piece of equipment to traverse the target site for a desired task, such having the equipment effectively move on the site without getting stuck, damaging the site, and/or being able to perform a desired task, such as ground engaging work (e.g., tillage, seeding, earth moving, etc.). Site soils and soil conditions with respect to water saturation can lead to equipment field condition and/or use issues, particularly when the equipment is large, heavy, and/or has a small footprint or point of contact. In some situations, the equipment can get bogged down in the ground, which may lead to equipment damage, loss of use, and/or site damage. In other situations, the equipment may not be able to effectively perform a desired task, such as tilling, planting, earth moving, harvesting, etc. In this aspect, an example, can identify site conditions that allow for desired field condition of the target site by a target piece of equipment. It should be understood that when the term performing a field operation, traversing, and the like are used herein it refers to traveling, driving or otherwise moving across a site using target equipment, and/or performing a desired operation at the site using the target equipment. Of note, in some implementation, the site conditions of the target site can be identified using the systems and techniques described herein independently of a target piece of equipment. That is, for example, information regarding site conditions of the target site may be utilized for various types of equipment, and/or for other agronomic purposes, such as water management at the target site.

As an illustrative example, a piece of target equipment may comprise a sugarcane harvester, tractor or similar vehicle used in agriculture or construction. In this example, the tractor comprises wheels that respectively provide a point of contact with the ground. In an alternate implementation, the tractor can comprise track assemblies disposed at one or more of the wheel location, instead of the wheels. In this implementation, for example, the track assemblies may be used to spread out the load of the tractor, as the tracks provide a larger footprint or point of contact with the ground.

In this implementation the exemplary control system 201 comprises a field condition determination component that uses a processor to generate machine sink data. The machine sink data can be generated based at least on location data that is indicative of a location of a target site. As an example, location data can comprise map coordinates, global position system (GPS) location data, or descriptive identification of the location of the target site. Further, for example, the target site can comprise the ground location (e.g., farm field or portion thereof) intended to be traversed by a target piece of equipment (e.g., ground-working equipment, such as an agricultural tractor and tillage equipment).

Additionally, the machine sink data can be generated based at least on soil data indicative of soil conditions at the target site stored in memory. That is, for example, soil conditions may comprise information about the soil types, soil characterization, composition, and other information that indicates soil conditions. As an example, soil maps are available in the United States that have been developed by the U.S. Geological Survey, local county soil districts, and other private entities that identify soil types, composition, and other characteristics for locations across the U.S. Other countries have developed similar soil surveys for their respective locations. These surveys are just one example of data that can be stored in memory and used to help generate the field condition data. Further, target site managers (e.g., farmers) may perform sampling of soil conditions periodically or at routine intervals to provide site condition data to a site management information system (e.g., farm management information system (FMIS)). That is, for example, a particular soil type, composition, and/or type and presence of plant cover may be more susceptible to standing water and/or saturation point than others and may provide for different field conditions. This information may be indicated by the soil data, which can help determine whether a particular piece of equipment can traverse the target site without potential issues.

In this implementation, the machine sink data is indicative of conditions at the target site that are related to field condition at the target site, by the target equipment. That is, for example, the location data can identify the target site, which can help identify which soil data will be used, based on the pre-identified soil data stored in memory. The identified soil data, for example, can help the field condition determination component determine the machine sink data for the target site.

The exemplary control system 201 comprises a field condition map generation component that generates a field condition map for a target area comprising the target site. The field condition map generation component can generate the field condition map based at least on the machine sink data that is received from the field condition determination component. Further, the field condition map generation component can generate the field condition map based at least on equipment identification data that is indicative of target equipment specifications for traversing the target site. That is, for example, the target equipment may have specifications that include the weight, type of ground contact (e.g., wheels and type, tracks and type), torque at respective axles, dimensions, towing capacity, downforce capacity, etc., which can be indicated by the equipment identification data. In this way, for example, the field condition map generation component can combine the machine sink data with the equipment identification data to determine whether the equipment may traverse the target site in a desired manner (e.g., without getting stuck, damaging the site, or being ineffective at a desired task such as tilling or planting).

Additionally, the field condition map generation component can generate the field condition map based at least on a target area data indicative of a desired target area that comprises the target site. For example, the desired target area can comprise an area, such as a farm, farm field, construction site, or other ground area that includes the target site (e.g., a farm field or portion, a portion of a construction site, or portion of the target area). In this example, the target area data can comprise map coordinates, GPS information, or other information that identifies the boundaries of the desired target area. In this way, the field condition map, generated by the field condition map generation component, can comprise a map of the desired target area with indications of field condition for the target equipment included on the map. For example, the map will indicate where the target equipment can effectively traverse in a desired manner, and/or to perform a desired task.

In one implementation, the exemplary control system 201 can comprise a site field condition management component that can be used to manage field condition of the target site. In this implementation, the site field condition management component receives the field condition map, which results in a determination of target site field condition for the target equipment. That is, for example, the field condition map can identify field condition locations at the target area for the target equipment. In this example, the field condition management component can determine whether the target site is comprised in an area of the field condition map identified as traversable by the target equipment. In this example, the determination of field condition can be used by an operator of the equipment to identify whether to, or when to, use the target equipment at the target site.

In another implementation, the exemplary control system 201 can comprise a display receiving the field condition map to render a visual representation of the field condition map of the target area viewable by an operator of the target equipment. As an example, the display can be disposed in an operator's cab of a vehicle (e.g., target equipment) to be viewable by the operator of the vehicle. In this example, the field condition map can be displayed on the display so that the operator can identify sites (e.g., the target site) within the target area that the vehicle (e.g., a towed equipment) can effectively traverse during operation. In this way, the operator may be able to avoid traveling over areas where field condition is not advised, and/or can plan for a desired operation at the target site.

In one implementation, the field condition determination component can generate the machine sink data based at least on weather data that is indicative of weather at the target site. As an example, current, past, and future predicted weather may have an effect on the field condition of the target site by the target equipment. That is, for example, a past weather event may have provided a known amount of precipitation at or near the target site. In this example, the impact that the identified precipitation has on field condition may be determined based on prior, known site conditions having similar data (e.g., similar combination of soil and weather data). Further, for example, current and future weather data may also provide information that can be compared with known site conditions to determine field condition for the target site, for the target equipment.

The field condition determination component can generate the machine sink data based at least on terrain data that is indicative of indicative of terrain at the target site. As an example, the terrain at the target site may impact field condition for the target equipment. For example, a sloped terrain may affect field condition in combination with the soil conditions, and/or weather data. In some situations, target equipment may not be able to effectively traverse a target site having a certain type of terrain, soil, and weather conditions. As another example, a valley or depression at a target site may retain or collect greater amounts of water from a weather event. In this example, in combination with the soil data, that site may not be effectively traversable by the target equipment or may be traversable using different equipment.

The field condition determination component can generate the machine sink data based at least on moisture data indicative of soil moisture level at the target site. For example, moisture data can be identified from site testing, or other analysis, collection of precipitation data, visual confirmation, remote sensing from aerial device (e.g., satellite, drone, etc.). As an example, moisture data may comprise the presence of water at various levels of the soil. For example, typically, surface and topsoil moisture levels may be more relevant to field condition than subsoil moisture levels. Moisture presence at different soil levels may be relevant where slopes (e.g., for stability) and/or water table levels are important. The moisture data, in combination with the soil data, may help determine field condition for the target equipment, and/or may help identify alternate equipment for use at the target site.

In one implementation, an example system, such as the exemplary control system 201, can comprise a sub-system that collects and analyzes real-time, in-situ data at a target site related to field condition of the target equipment. In some implementations, the real-time, in-situ data can be used to determine site field condition in real-time, for example, allowing an operator of the equipment to identify traversable locations for the equipment. In some implementations, the real-time, in-situ data can be shared (e.g., communicated over a communications network) between equipment/vehicles in a fleet of vehicles at a target site, and/or communicating with a site management information system. In this way, for example, site field condition for various equipment may be identified using real time data in combination with other know site condition data. Further, in some implementation, the real-time, in-situ data can be used to update a field condition map, and/or train a field condition system to improve analysis and decision making for generating field condition maps.

In one implementation of at least a portion of a sub-system for collecting real time, in-situ data related to field condition. In this implementation, the system can comprise a site condition analyzing component. The site condition analyzing component can comprise a sensor array (e.g., comprising one or more sensors, such as disposed on the target equipment, vehicle, in-place stationary site, drones, etc.) to detect one or more site conditions in real-time. In this implementation, the site condition analyzer can generate real-time data indicative of real-time site conditions related to field condition. As an example, real time site conditions can comprise soil types/conditions, moisture levels, terrain, weather, ground conditions, and more. These site conditions can help determine site field condition and may be used to train the field condition determination component, and/or the field condition map generation component to improve field condition outcomes for target equipment under similar conditions.

In one implementation, the site condition analyzing component can comprise an image sensor 406, such as associated or comprised in the sensor array. In various implementations, the image can use one or more of the following to generate image data: a visible light detector, such as a charge-coupled device (CCD), active pixel sensor (APS), or other sensors; an infrared sensor, that captures images of passive or active infrared light; a polarized light detector; an electromagnetic wave detector, such as a radar device; an active acoustic imaging sensor; and/or a laser light detector. As an example, various types of electromagnetic radiation detectors may be utilized (e.g., including for radio waves, microwaves, infrared, (visible) light, ultraviolet, X-rays, and gamma rays), and other imaging detectors, such as sonic wave emitters/sensors. These detectors can be used to produce various types of images of the target site to identify conditions related to field condition. That is, for example, moisture content, soil types and characteristics, terrain, object detection, and other conditions may be derived from image data generated by the various detectors.

In one implementation, the site condition analyzing component can generate real-time data indicative of real-time site conditions related to field condition based at least on real-time wheel slip data. The wheel slip data can be received from one or more wheel slip sensors that are disposed on the target equipment. As an example, the wheel slip sensors can comprise one or more components that directly or indirectly detect wheel slippage. That is, for example, wheel slippage can be detected by identifying how the transmission operates in relation to forward movement of the vehicle, thereby inferring the slippage instead of direct detection. In other examples, some equipment may have direct measurement sensor(s) to detect wheel slippage. The wheel slip data can be indicative of an amount of wheel slippage of one or more wheels of the target equipment. As an example, the driven/powered wheels of equipment, such as tractors, provide a certain amount of torque and power. Under certain conditions the wheels may slip relative to the ground, instead of translating the equipment proportionally to the amount of rotation of the wheel (e.g., or track). In this example, the wheel may rotate more in relation to the proportional linear translation of the vehicle (e.g., slip). The wheel slip sensors(s) can detect the amount of slippage and provide the wheel slip data indicative of this slippage amount to the site condition analysis component. For example, wheel slippage may be detected by measuring wheel rotation speed and comparing (e.g., in ratio) to movement of the equipment (e.g., using a locator, speed detection, and/or GPS). Increased wheel slippage may be indicative of site condition (e.g., muddy soil) that limit the ability of the equipment to traverse the target site. Little or no wheel slippage may be indicative of favorable site conditions for field condition.

In some implementations, the site condition analyzing component can generate real-time data indicative of real-time site conditions related to field condition based at least on real-time force data. The real-time force data can be received from a load/force sensor disposed on the target equipment that detects one or more of down force and draft force. The force data can be indicative of an amount of downforce applied by a piece of towed equipment to the target equipment, and/or the amount of draft force applied by the towed equipment. That is, for example, a tractor may tow a ground working implement (e.g., tillage, seeder, scraper, etc.), and the implement imparts downward force on the rear of the tractor, along with a draft force. The downward force is typically applied to the rear axle, for example, and the draft force results from the amount of force needed to tow the implement for the task. As an example, the amount of force (e.g., downward or draft) can have an impact on the field condition of the equipment at the target site, in combination with other site conditions. For example, muddy soil conditions may reduce field condition for equipment detecting a large down or draft force, such as from a large piece of towed equipment, or one that has a large contact or impact with the ground.

The example control system 201 can generate an alert signal that indicates a real-time alert to the operator of the target equipment. The real-time data, such as from the sensor array, wheel slip sensor, force sensor, may be indicative of field condition threshold that is not met for the target equipment. That is, for example, the target equipment may be associated with a pre-determined field condition threshold for the target site, where the field condition threshold is indicative of a site condition that provides for appropriate field condition of the target equipment (e.g., without potential problems as described above). In this example, if the field condition threshold is not met, as indicated by real-time data, an alert signal can be generated to alert the operator. For example, the alert signal may alert the operator that the target equipment may not effectively traverse the target site, and the operator can take appropriate action. As an example, the operator may choose to avoid the location of alert, may choose to select another piece of equipment, or may adjust the target equipment such that it meets the threshold. For example, for a tracked vehicle, the track tension may be adjusted; for a wheeled vehicle the tires may be deflated for greater tire coverage; or tires may be substituted for tracks; etc.

The example control system 201 can comprise a field condition updating component that generates update data indicative of updated site conditions identified by the site condition analyzing component. The field condition updating component can automatically update the field condition map generation component with the update data based at least upon the real-time data indicative of real-time site conditions related to field condition. Further, the field condition updating component can provide update data to the field condition determination component to provide for site condition learning. That is, for example, the field condition map can be updated in real-time based on the update data, which is indicative of in-situ conditions in real time. In this way, the operator may be able to detect conditions that make field condition difficult, and/or use the updated map to alter a path for the target equipment. Additionally, the update data can be used to train the field condition determination component to provide more accurate results related to site field condition. As an example, the sensors may be able to provide actual site conditions, which combined with the pre-determined site conditions, can provide for improved accuracy in future field condition determination for the target equipment.

The site field condition management component can identify a pre-determined path for the target equipment to traverse based at least upon the field condition map. In this implementation, the example system can comprise an autonomous vehicle sub-system that autonomously operates the target equipment in accordance with the pre-determined path. As an example, the field condition map can identify target sites in the target area where the target equipment may effectively traverse. The autonomous vehicle system can be used to autonomously (e.g., without direct human operation) operate the target equipment, such as a tractor operating in a farm field, or construction equipment operating in a construction site. In this implementation, the field condition management component can set up the predetermined path, based on the field condition map, and a desired operation of the target equipment (e.g., task assigned to the equipment). The autonomous vehicle system can use the predetermined path as a guide to autonomously operate the target equipment along the pre-determined path.

The example control system 201 for identifying field condition of a site by equipment can comprise one or more sensors disposed on target equipment. The one or more sensors can detect one or more site conditions at a target site in real-time. The one or more sensors can generate site condition data that is indicative of the one or more site conditions related to field condition at the target site. Further, the example control system 201 can comprise a site condition analyzing component using a component to generate real-time site field condition data indicative of real-time site field condition conditions based at least upon the site condition data. Additionally, the example control system 201 can comprise a field condition map generation component that generates a field condition data of a target area for the target equipment at the target site based at least on the real-time site field condition data. In this implementation, a data can receive the field condition data to render a visual representation of the field condition data of the target area viewable by an operator of the target equipment.

As an example, an operator may be driving a tractor comprising the example, control system 201. In this example, the sensors can detect real-time, in-situ site conditions, such as soil conditions, terrain, moisture, wheel slippage, force, etc., and site data can be generated by the sensors. The site condition analyzer can identify real time field condition information, such as whether a field condition threshold has been met for the target equipment, using the real time data, and generate the real-time field condition data. The field condition map generator can generate a real-time field condition data based on the real time, in-situ conditions; ant the data can be displayed to the operator on the data. In this way, the operator may make decision on effective field condition in real-time. Alternatively, an autonomous vehicle system may utilize the field condition data to make appropriate field condition decisions on the fly.

In some implementations, the one or more sensors can comprise a soil saturation sensor that detects an amount of water present in the soil at the target site. Further, in some implementations, the one or more sensors can comprise an image sensor that detects soil conditions based at least on image data. For example, the detected moisture levels and/or soil conditions can be used to identify in-situ, real time site conditions for the target site.

In some implementations, the field condition map generating component can generate the field condition data for the target area comprising the target site based at least on-site field condition data received from a field condition determination component. For example, the field condition determination component can identify historical field condition data, which can be combined with the real-time field condition data to help generate the field condition data. Further, the field condition map generating component can generate the field condition data for the target area comprising the target site based at least on equipment identification data indicative of the target equipment, and/or the target area data indicative of the target area that comprises the target site. Similarly, as described above, the field condition determination component can generate the site field condition data based at least on location data indicative of a location of the target site, and soil data indicative of soil conditions at the target site. In this implementation, the field condition data is indicative of conditions at the target site related to field condition at the target site.

In some implementations, the example control system 201 can comprise a site field condition management component used to manage field condition of the target site. The field condition management component can receive the field condition data to determine field condition for the target equipment at the target site. Further, the example control system 201 can comprise an autonomous vehicle sub-system that autonomously operates the target equipment in accordance with a pre-determined path for the target equipment to traverse based at least upon the field condition data.

A data cache, such as local or remote memory or data storage, can store remote imagery data, such as images of a target area comprising a target site. The imagery can comprise multi-spectral imagery, visible light imagery, temporal images (e.g., historical images), etc., which may be sourced from satellites and/or aerial vehicles. A geo-reference library can store data of shape files comprising surface geo-locations or features (e.g., plats, fields, etc.). A geo-locator (e.g., GPS, mapping software, etc.) can collect location data for a target site, to identify corresponding geo-shape data and remote imagery for the target site. A field condition engine (e.g., field condition determination component) can generate field condition data, such as using site data and site engine (e.g., weather, soil, water management, terrain). A field condition map generation engine can generate a field condition map/model based on the field condition data, and equipment identification engine. The field condition map/model can be used by a farm management system, for example, to determine when certain target sites can be effectively traversed. An operator can use the map, such as on a display, to identify an appropriate field condition path during operation of the target equipment.

In an alternate implementation of one or more systems described herein, an equipment data library can comprise local or remote memory or data storage, which stores data indicative of various type of equipment, machinery, vehicles, etc. that may be the subject of a field condition inquiry. In this implementation, real-time in situ data can be loaded to a learning engine, which can update accuracy of the field condition data based on real, in-situ conditions and vehicle operations. Further, the real, in-situ information can be uploaded to the equipment data library, such as the position, the terrain, and operational data, such as wheel slippage, force applied (e.g., downforce, draft force), speed of vehicle, along with site conditions. In this way, for example, the system may be able to provide more accurate field condition information for similar or same types of equipment in similar or same conditions.

In another alternate implementation, a vehicle positioning component (e.g., GPS) provides vehicle location data to a field condition zone data module. The field condition zone data module identifies a zone of field condition, such as displayed on the field condition map on a display. The zone of field condition may be defined by a field condition threshold, which is indicative of conditions that allow the equipment to traverse the target site, based on the equipment specification data and the field condition map/model. Soil data can be provided by the site field condition management component, such as using a remote communications component, such as a wireless transmitter. A real-time alert signal can be provided to the operator of the equipment if the equipment travels outside of the field condition zone.

In yet another alternate implementation of one or more systems described herein, the target equipment can be traversing (or planning to traverse) a target site, such as a farm field 1000. On-board image sensor may be used to collect images of the target site, and a site classifier can determine a type of site for the target site (e.g., based on terrain, soil conditions, etc.). The equipment location can be determined by an on-board locator and used to help determine a path using a path planning module. During operation, a slip determination module can identify wheel or transmission slip using sensor (e.g., or determined using indirect measurements as described above), and identify the location of slip using the locator. The information may be transmitted to a learning engine (e.g., either locally or remotely disposed), using a communications module. The learning engine can use the identified slip data, in combination with the site classification information, to more accurately predict an appropriate field condition path for the equipment.

In yet another alternate implementation of one or more systems described herein, the field condition map/model be used by a planning module to develop a task plan/map for target equipment at a target site. In this implementation, a task model can be input to the planning module, where the task model comprises information related to tasks for the target site, such as tilling, planting, spraying, harvesting, etc. Further, geo-reference data can comprise information related to the target site, such as shapes and locations of fields for the task model. The geo-reference data can be input to the planning module, along with production system data. The production system data can comprise data indicative of field production, such as planting maps, paths of previous vehicle passes, etc. The planning module can develop a task plan/map that identifies timing, locations, paths, speed limits, equipment settings, and other information used to operate the equipment appropriately to perform the desired tasks in the task model. As an example, this information can be used by an operator to operate the equipment or loaded to an autonomous vehicle system to autonomously operate the vehicle.

In still another alternate implementation of one or more systems described herein, a planning module can receive geo-reference data for the target site, the field condition map/model, weather data, and task/equipment information data. The task/equipment information data can comprise information identifying the desired tasks, and task models, along with equipment specifications, and equipment models that identify tasks associated with specific equipment, at target sites. The planning module generates a task plan for a desired period, such as a planting season. The task plan can identify which equipment can be used at which times, and for which purposes, according to the field condition map, task models, weather, equipment spec, and location data. The task plan identifies and updates a schedule accordingly (e.g., based on task plan times, soil conditions, weather, etc.). An equipment dispatch module can be communicatively coupled with an autonomous equipment management system, which can dispatch the target equipment to perform the tasks, at the target sites, at the appropriate times.

Exemplary Intelligent Control for Determining Field Conditions

Figure 5:
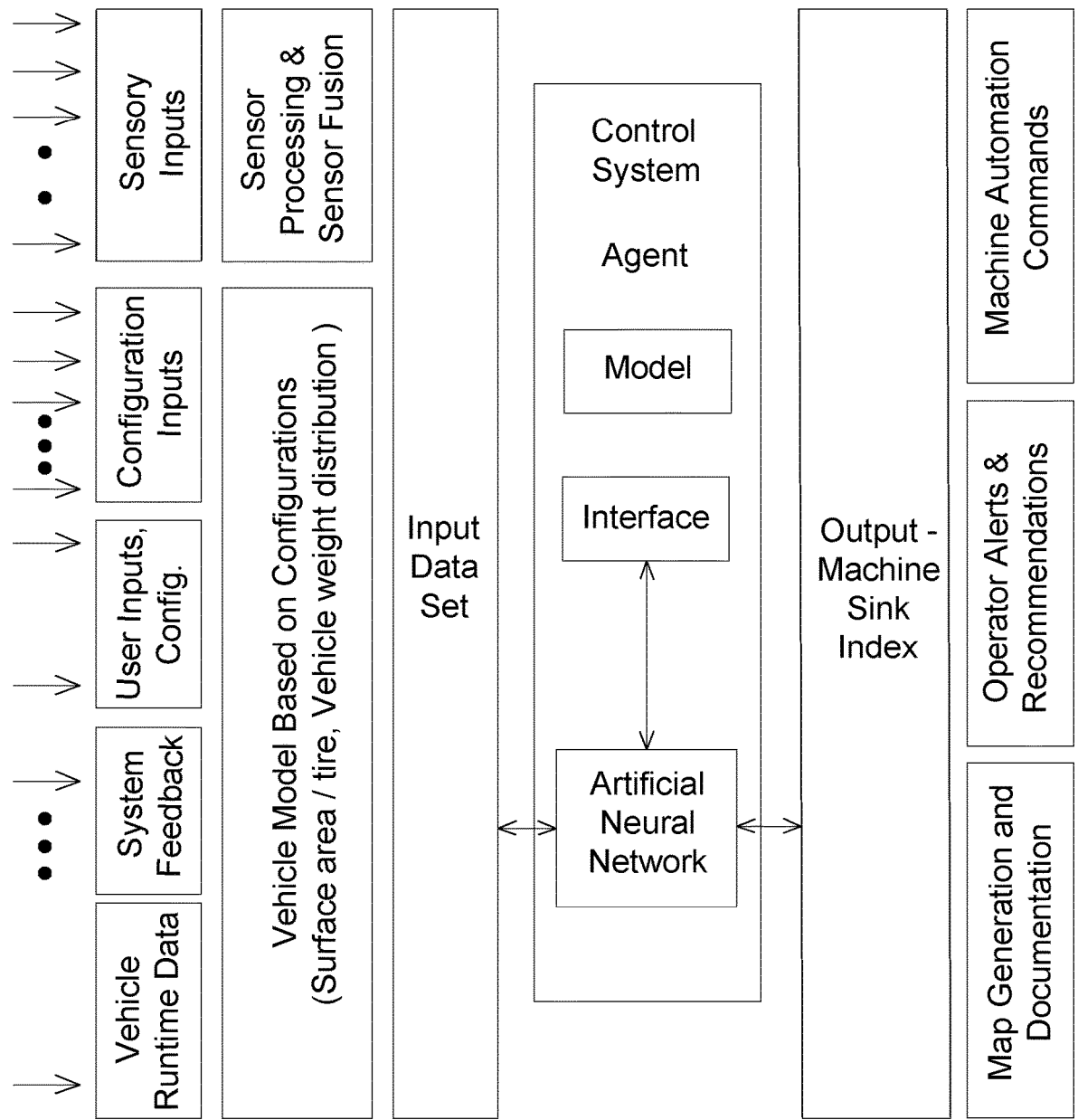
FIG. 5 is a block diagram of a computing environment that can be used in the architectures to determine sink index and taking/suggesting relevant actions to the operator/vehicle automatic navigation system and/or generating maps for future reference.

In one example, intelligent control of a system for determining field conditions is provided. FIG. 5 illustrates the block diagram representation of artificial neural network architecture behind field condition system of this disclosure. The data from various sensors like ground penetrating radar mounted on sugarcane harvester, data captured from unmanned aerial vehicle performing surveillance over the farm, vehicle configuration inputs including, though not limited to, model type, weight, tire tread width etc., inputs given by operator, real time inputs are fed into a control system which is principled on artificial neural network methodology. The control processes the various inputs received from sensors, operator, configuration inputs, and historical data and outputs the sink index which is a parameter signifying the sinking vulnerability of certain patches where if the sugarcane harvester arrives will experience sinking.

To predict the sink index of the vehicle at any point of the field 1000, the coefficient of friction for soil/ground at that point or area is determined with the machine learning model considering various parameters. Normal Force: (N) Block resting on horizontal surface, the normal force is:

N=mg (m=mass, g=gravitational acceleration)

Coefficient of friction (μ) is ratio of force of friction between two bodies and force pressing them together.

To determine if vehicle will sink at specific part of the field 1000, the field condition system will need to know vehicle's weight and tire configuration (number of tires, tire diameter, tire pressure, soil contact area etc.). The field condition system may also have information about the soil and its characteristics.
1. Static and kinetic friction force of the soil
2. Bearing Capacity of the soil (Soil strength) to overcome sinkage
3. Force per unit area and area (tire area)

Based on the derived machine sink index, various possibilities can occur. The various outputs are determined by the ANN model to predict sink and slippage index and the map can be generated for future passes for given field 1000. The model may also provide the required machine conditions to avoid sinking or slipping. The automatic navigation system of sugarcane harvester may process this information and make necessary changes in steering while the sinkable patches approach near the harvester. Another way could be alerting the operator of the areas of poor field conditions of the farm and providing preventive recommendations to the operator. Also, the information of these poor field conditions may be recorded in the form of map and could be referred in future.

Sink Index estimation is a classical regression problem and can be solved by Long Short-Term Memory networks (LSTM). Recurrent Neural Networks (RNN) which excel in learning can be formed from sequential time series data. LSTM is a type of recurrent neural network that learnt an internal representation of these time series data and remember over long sequences of input data and previous operation of machine.

FIGS. 5-9 show a high-level illustration of a network environment 300, according to one example of an agricultural vehicle 100. The vehicle 100 includes a network digital data environment that connects the control system 201, input controllers 320 and sensors 330 via a network 310. Various elements connected within of the environment 300 include any number of input controllers 320 and sensors 330 to receive and generate data within the environment 300. The input controllers 320 are configured to receive data via the network 310 or from their associated sensors 330 and control (e.g., actuate) an associated component or their associated sensors. Broadly, sensors 330 are configured to generate data (i.e., measurements) representing a configuration or capability of the vehicle 100. A "capability" of the vehicle 100, as referred to herein, is, in broad terms, a result of a component action as the vehicle 100 performs a field operation (takes actions) in a geographic area such as a field 1000. Additionally, a "configuration" of the vehicle 100, as referred to herein, is, in broad terms, a current speed, power consumption, position, setting, actuation level, angle, etc., of a component as the vehicle 100 takes actions. A measurement of the configuration and/or capability of a component or the vehicle 100 can be, more generally and as referred to herein, a measurement of the "state" of the vehicle 100. That is, various sensors 330 can monitor associated components the field, a vehicle mission plan, the state of the vehicle 100, or any other aspect of the vehicle 100.

An agent 340 executing on the control system 201 inputs the measurements received via the network 310 into a control model 342 as a state vector. Elements of the state vector can include numerical representations of the capabilities or states of the system generated from the measurements. The control model 342 generates an action vector for the vehicle 100 predicted by the model 342 to improve vehicle 100 performance. Each element of the action vector can be a numerical representation of an action the system can take to adjust the speed of vehicle 100 speed, power consumption (PTO), manipulate the environment, or otherwise affect the performance of the vehicle 100. The control system 201 sends machine commands to input controllers 320 based on the elements of the action vectors. The input controllers 320 receive the machine commands and actuate associated components to take an action. Generally, the action leads to an increase in vehicle 100 performance.

In some configurations, control system 201 can include an operator interface 238 as described previously. The operator interface 238 allows a user to interact with the control system 201 and control various aspects of the vehicle 100. Generally, the operator interface 238 includes an input device and a display device. The input device can be one or more of a keyboard, button, touchscreen, lever, handle, knob, dial, potentiometer, variable resistor, shaft encoder, or other device or combination of devices that are configured to receive inputs from a user of the system. The display device can be a LED, LCD, plasma display, or other display technology or combination of display technologies configured to provide information about the system to a user of the system. The interface can be used to control various aspects of the agent 340 and model 342.

The network 310 can be any system capable of communicating data and information between elements within the environment 300. In various configurations, the network 310 is a wired network, a wireless network, or a mixed wired and wireless network. In one example, the network is a controller area network (CAN) and the elements within the environment 300 communicate with each other over a CAN bus.

Figure 6:
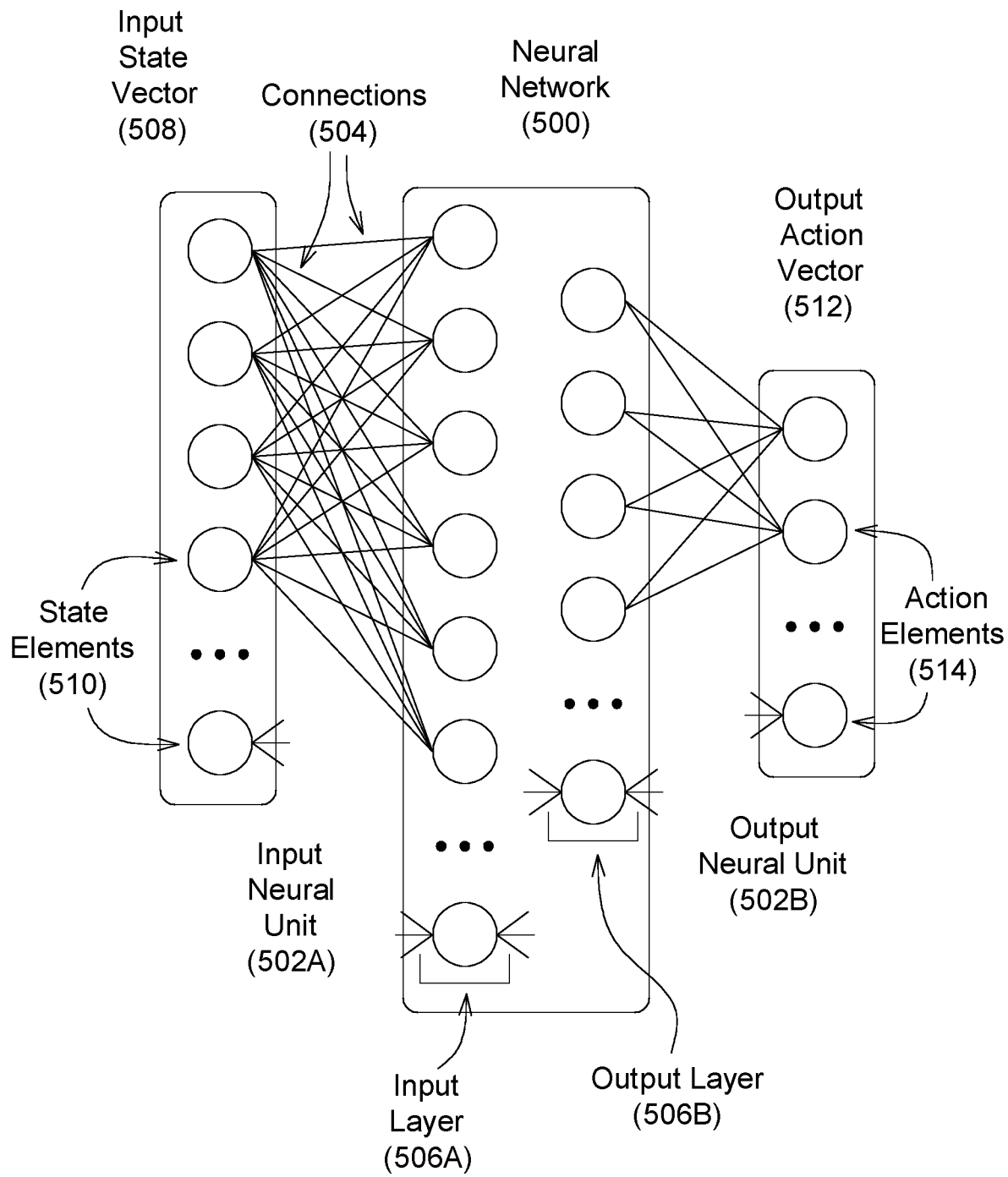
FIG. 6 is an illustration of an artificial neural network of the model according to one example of a agricultural vehicle.

Referring now to FIG. 6, the model 342 described in herein can also be implemented using an artificial neural network (ANN). That is, the agent 340 executes a model 342 that is an ANN. The model 342 including an ANN determines output action vectors 512 (machine commands) for the vehicle 100 using input state vectors 508 (measurements). The ANN has been trained such that determined actions from elements of the output action vectors 512 increase the performance of the vehicle 100. The ANN 500 is based on a large collection of simple neural units 502. A neural unit 502 can be an action (a), a state (s), or any function relating actions (a) and states (s) for the vehicle 100. Each neural unit 502 is connected with many others, and connections 504 can enhance or inhibit adjoining neural units 502. Each individual neural unit 502 can compute using a summation function based on all the incoming connections 504. There may be a threshold function or limiting function on each connection 504 and on each neural unit itself 502, such that the neural units 502 signal must surpass the limit before propagating to other neurons. These systems are self-learning and trained, rather than explicitly programmed. Here, the goal of the ANN is to improve vehicle 100 performance by providing outputs to carry out actions to interact with an environment, learning from those actions, and using the information learned to influence actions towards a future goal. For example, in one example, a vehicle 100 takes a first pass through field 1000 to perform a field operation such as harvesting sugar cane. Based on measurements of the machine state, the agent 340 determines a reward which is used to train the agent 340. Each pass through the field 13 the agent 340 continually trains itself using a policy iteration reinforcement learning model to improve machine performance.

The neural network of FIG. 6 includes two layers 506: an input layer 506A and an output layer 506B. The input layer 506A has input neural units 502A which send data via connections 504 to the output neural units 502B of the output layer 506B. In other configurations, an ANN can include additional hidden layers between the input layer 506A and the output layer 506B. The hidden layers can have neural units 502 connected to the input layer 506A, the output layer 506B, or other hidden layers depending on the configuration of the ANN. Each layer can have any number of neural units 502 and can be connected to any number of neural units 502 in an adjacent layer 506. The connections 504 between neural layers can represent and store parameters, herein referred to as weights, that affect the selection and propagation of data from a layer's neural units 502 to an adjacent layer's neural units 502. Reinforcement learning may then train the various connections 504 and weights such that the output of the ANN 500 generated from the input to the ANN 500 improves vehicle 100 performance. Finally, each neural unit 502 can be governed by an activation function that converts a neural units weighted input to its output activation (i.e., activating a neural unit 502 in each layer). Some example activation functions that can be used are: the softmax, identify, binary step, logistic, tan H, Arc Tan, softsign, rectified linear unit, parametric rectified linear, bent identity, sing, Gaussian, or any other activation function for neural networks.

Mathematically, an ANN's function (F(s), as introduced above) is defined as a composition of other sub-functions gi(x), which can further be defined as a composition of other sub-sub-functions. The ANN's function is a representation of the structure of interconnecting neural units 502 and that function can work to increase agent performance in the environment. The function, generally, can provide a smooth transition for the agent towards improved performance as input state vectors 508 change and the agent takes actions.

Most generally, the ANN 500 can use the input neural units 502A and generate an output via the output neural units 502B. In some configurations, input neural units 502A of the input layer 506A can be connected to an input state vector 508 (e.g., s). The input state vector 508 can include any information regarding current or previous states, actions, and rewards of the agent in the environment (state elements 510). Each state element 510 of the input state vector 508 can be connected to any number of input neural units 502A. The input state vector 508 can be connected to the input neural units 502A such that ANN 500 can generate an output at the output neural units 502B in the output layer 506B. The output neural units 502B can represent and influence the actions taken by the agent 340 executing the model 342. In some configurations, the output neural units 502B can be connected to any number of action elements 514 of an output action vector 512 (e.g., a). Each action element can represent an action the agent can take to improve vehicle 100 performance. In another configuration, the output neural units 502B themselves are elements of an output action vector 512.

This section describes an agent 340 executing a model 342 for predicting field conditions, for example with respect to agricultural vehicle 100 the model 342 will predict areas of a field 1000 with poor field conditions and reroute vehicle 100 around those areas. In this example, model 342 is a reinforcement learning model implemented using an artificial neural net. That is, the ANN includes an input layer 506A including many input neural units 502A and an output layer 506B including many output neural units 502B. Each input neural unit is connected to any number of the output neural units 502B by any number of weighted connections. The agent 340 inputs measurements of the vehicle 100 to the input neural units 502A and the model outputs actions for the vehicle 100 to the output neural units 502B. The agent 340 determines a set of machine commands based on the output neural units 502B representing actions for the vehicle 100 that improves vehicle 100 performance.

Figure 7:
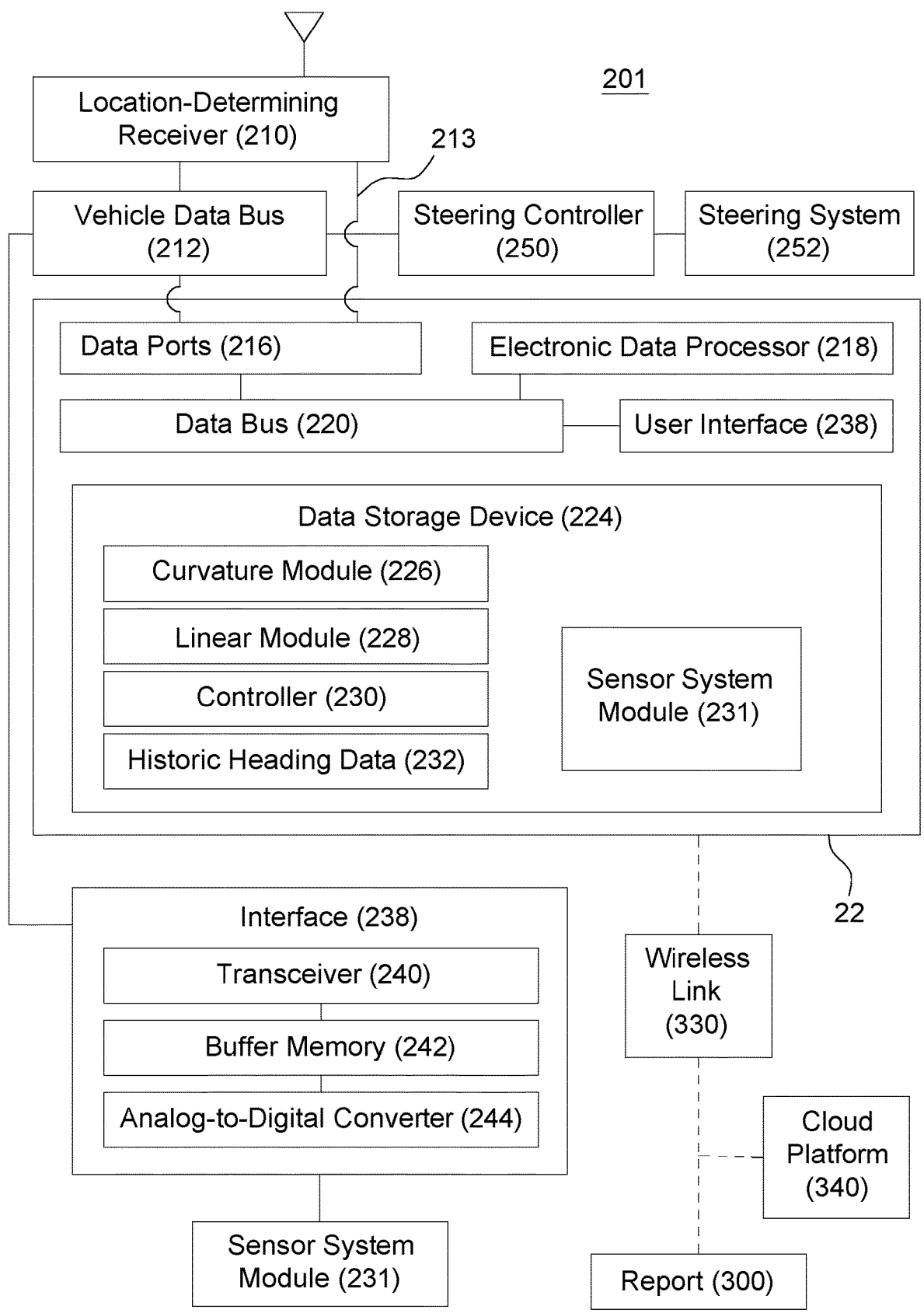
FIG. 7 is a block diagram of an example of guidance for an agricultural vehicle.
Figure 8:
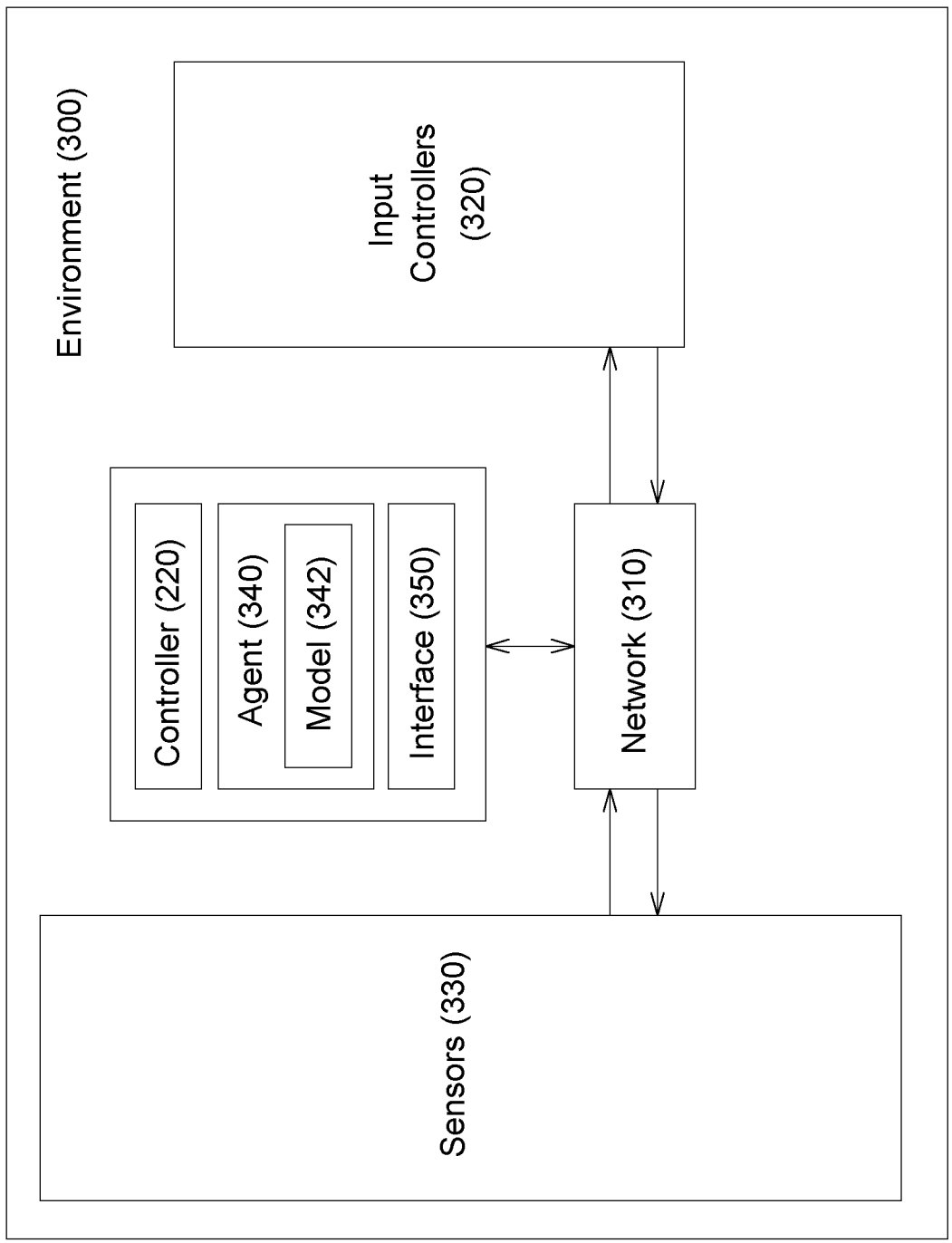
FIG. 8 is a high-level illustration of a network environment according to one example of an agricultural vehicle.

In accordance with FIG. 7, one example of the control system 201 (also generally shown in FIG. 5) for guidance of an agricultural vehicle 100 a location-determining receiver 210 directly, or via an optional vehicle data bus 212. The optional vehicle data bus 212 is shown in dashed lines because it is optional and the connection between the control system 201 and location-determining receiver 210 may be direct, as indicated by transmission line 213, which can be used separately or cumulatively with the interconnection via the optional vehicle data bus 212.

In one example, the control system 201 comprises an electronic data processor 218, one or more data ports 216, a user interface 238 and data storage device 224 coupled to a data bus 220. The data storage device 224 may store, retrieve, read and write one or more of the following items: a curvature module 226, a linear module 228, a controller 230, and historic heading data 232. A module means software, electronics, or both. As used herein, heading can refer to: (1) an angular direction of travel of the vehicle with reference to due North or magnetic North, or (2) a yaw or yaw angle of the vehicle with reference to coordinate system, such as a Cartesian coordinate system.

The electronic data processor 218 may comprise a processor, a microcontroller, a digital signal processor, an application specific integrated circuit (ASIC), a programmable logic array, a programmable logic device, a logic circuit, an arithmetic logic unit, a Boolean logic device, or another data processing device. The data port 216 may comprise a data transceiver 240, buffer memory 242, or both. The user interface 238 may comprise one or more of the following: a display, a touch screen display, a keypad, a keyboard, a control panel, a pointing device (e.g., electronic mouse), or another device for entry or output of data from the data processing system 214. The data storage device 224 may comprise one or more of the following: electronic memory, nonvolatile electronic memory, an optical data storage device, a magnetic data storage device, or other device for storing digital or analog data.

In one example, the controller 230 comprises logic for deciding whether to use the curvature module 226 or the linear module 228 for estimating the projected heading of the vehicle at any given time or at a current location of the vehicle. For example, the controller 230 or the data processor 218 is arranged to determine the estimated curvature and compare the estimated curvature to a threshold to decide whether or not to use the curvature or the linear module 228 for estimating the projected heading of the vehicle or deciding between the first guidance mode and the second guidance mode. The data processor 218 or controller 230 may determine the estimated curvature of the historic path of the vehicle in accordance with the following equation: $C=\Delta P/D$, where C is the curvature, $\Delta P$ is the path heading change (e.g., recent historic path heading change), and D is the path distance (e.g., recent historic path distance traversed).

In one example, the curvature module 226 comprises software instructions (files, or data) related to determining or estimating a projected heading of a vehicle based on historic path heading data stored in, retrieved from or associated with the data storage device 224. For example, a curvature module 226 is configured to determine a secondary guidance path based on a running average (e.g. mode, mean or median) of the recent historic path heading consistent with a curvature limit of a curved path plan if the estimated curvature of the recent historic path heading is greater than, or equal to, a threshold.

In one example, the linear module 228 comprises software instructions related to determining or estimating a projected heading of a vehicle based on recent historic path heading data stored in, retrieved from or associated with the data storage device 224. For example, a linear module 228 determines the secondary guidance path based on a running average (e.g., mode, mean or median) of the recent historic path heading consistent with a linear limit of a curved path plan if the estimated curvature of the recent historic path heading is less than a threshold.

As used in this disclosure, configured to, adapted to and arranged to may refer any of the following items: (1) software or program instructions that are stored in the data storage device 224 or other data storage and executable by the data processor 218 to perform certain functions, software, (2) software or embedded firmware that are stored in the location-determining receiver 210 or its memory or data storage to perform certain functions, or (3) electronic, electrical circuits or modules that can perform substantially equivalent functions to the software, embedded firmware or program instructions.

In one example, the location-determining receiver 210 provides one or more of the following types of data for a vehicle: historic heading data 232, heading data, velocity data, and location data. The location-determining receiver 210 may comprise a satellite navigation receiver, a Global Navigation Satellite System (GNSS) receiver, a Global Positioning System (GPS) receiver, or another receiver for determining position data, velocity data, and heading data for the vehicle. For example, the location-determining receiver 210 may comprise a satellite navigation receiver with differential correction for providing precise position data, velocity data and heading data for the vehicle. A separate receiver or transceiver (e.g., satellite, cellular, or wireless device) may receive the correction data or differential correction data via a wireless signal transmitted from a satellite or a terrestrial base station (e.g., real-time kinematic (RTK) base station).

In one example, a location-determining receiver 210 is arranged to determine the secondary guidance path based on the historic path heading consistent with headings estimated by a location-determining receiver 210 for corresponding historic locations of the vehicle. The historic path heading may have substantially linear path segments, substantially curved path segments or both.

The system 201 of FIG. 7 further comprises an interface 238, a sensor system module 231 that receives input from one or more vehicle 100 sensors, a steering controller 250 and a steering system 252. Further, the data storage device 224 further stores, retrieves, writes or reads a sensor system module 231. In one example, the interface 238 is coupled to the vehicle data bus 212. In turn, sensor system module 231 is coupled to the interface 238. In one example, the interface 238 comprises an analog-to-digital converter 244, buffer memory 242 and a transceiver 240. The analog-to-digital converter 244 is arranged for changing the resultant electrical signal from an analog signal to a digital signal. The interface 238 further comprises buffer memory 242 for receiving and storing the digital signal prior to or during transmission of the digital signal to the vehicle data bus 212 or the data processing system 214 via the transceiver 240.

In one example, the sensor system module 231 is adapted to determine field conditions of a field 1000 by analyzing, deriving or evaluating digitized electrical signals, or associated data, provided by one or more onboard or offboard sensors associated with the vehicle 100. These sensors may include a visible light detector; an infrared light detector; a polarized light detector: an electromagnetic wave detector: an active acoustic imaging sensor; a force/load sensor; a laser light and ground penetrating radar position to sense characteristics of a field 1000 and/or field conditions.

A steering controller 250 can be coupled to the vehicle data bus 212. In turn, the steering controller 250 is coupled to a steering system 252. In one example, the steering system 252 comprises an actuator or an electrical motor that is mechanically coupled or linked to a mechanical steering system, a rack and pinion steering system, an Ackerman steering system or another steering system. In another example, the steering system 252 comprises an electro-hydraulic steering system where an electrical actuator controls one or more hydraulic valves for steering a vehicle.

In another example, the control system 201 as shown in FIG. 7 can generate a report 300 of the performance of the agricultural vehicle 100 while in a field 1000. This performance report 300 can either be uploaded to the cloud platform 340 over the wireless link 330 or can be sent directly to the operator located either in the vicinity of the field 1000 or located remotely. In case of malfunction within the agricultural vehicle 100, or depletion of fuel for the agricultural vehicle 100 or any other incident, the system will have the capability to capture the surroundings of the vehicle and send that information which could be included in the report 300 to the operator. Also, in one example, if the agricultural vehicle 100 halts for some time, it will store the location of the position where the operation was carried out for the last time. The operation can later be resume from the same location to avoid any miss or duplication operations while in the field 1000. The path planning and/or tracking algorithms can also consider executing simultaneous operations in the vehicle. An example of this could be running the PTO while the agricultural vehicle 100 is moving.

Figure 9:
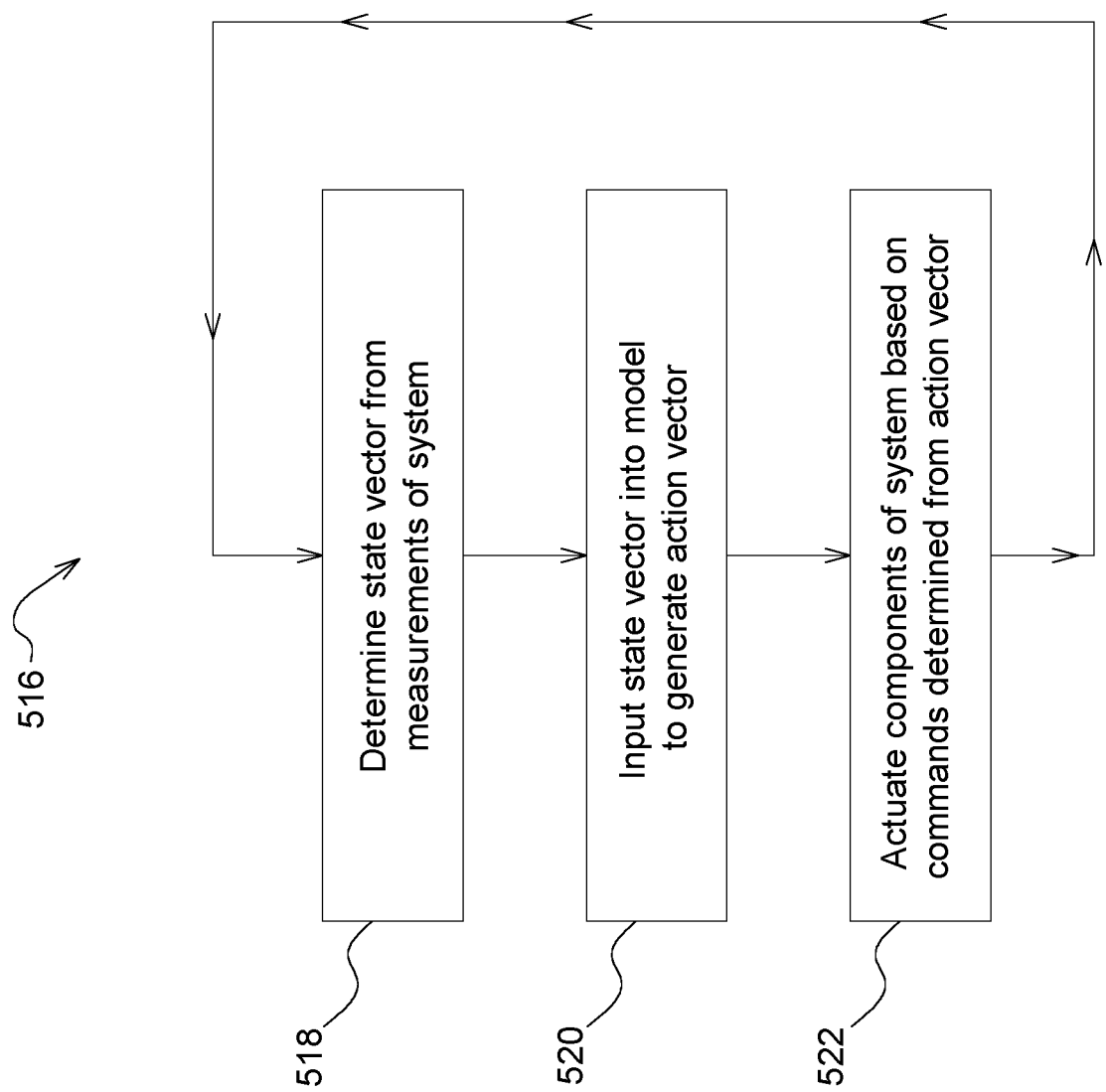
FIG. 9 is a flow diagram illustrating a method for generating actions that improve agricultural vehicle performance using an agent executing a model including an artificial neural network.

FIG. 9 is a method 516 for generating actions that improve vehicle 100 performance using an agent 340 executing a model 342 including an artificial neural net trained using an actor-critic method. Method 516 can include any number of additional or fewer steps, or the steps may be accomplished in a different order. First, the agent determines 518 an input state vector 508 for the model 342. The elements of the input state vector 508 can be determined from any number of measurements received from the sensors 330 via the network 310. Each measurement is a measure of a state of the machine 10.

Next, the agent inputs 520 the input state vector 508 into the model 342. Each element of the input vector is connected to any number of the input neural units 502A. The model 342 represents a function configured to generate actions to improve the performance of the vehicle 100 from the input state vector 508. Accordingly, the model 342 generates an output in the output neural units 502B predicted to improve the performance of the vehicle 100. In one example, the output neural units 502B are connected to the elements of an output action vector 512 and each output neural unit 502B can be connected to any element of the output action vector. Each element of the output action vector 512 is an action executable by a component of the vehicle 100. In some examples, the agent 340 determines a set of machine commands for the components based on the elements of the output action vector 512.

Next, the agent 340 sends the machine commands to the input controllers 320 for their components and the input controllers 320 actuate 522 the components based on the machine commands in response. Actuating 522 the components executes the action determined by the model 342. Further, actuating 522 the components changes the state of the environment and sensors 330 measure the change of the state.

The agent 340 again determines 518 an input state vector 508 to input 520 into the model and determine an output action and associated machine commands that actuate 522 components of the vehicle 100 as the vehicle 100 travels through the field 1000. Over time, the agent 340 works to increase the performance of the vehicle 100 when dispensing feed.

In one example, model 342 has as an input various states that can be included in an input data vector. The properties of the input data vector may include measurement m of each state, the sensor(s) 330 that generate the measurement m, and a description of the measurement. The input data vector can additionally or alternatively include any other states determined from measurements generated from sensors of the vehicle 100. For example, in some configurations, the input state vector 508 can include previously determined states from previous measurements m. In this case, the previously determined states (or measurements) can be stored in memory systems of the control system 201. In another example, the input state vector 508 can include changes between the current state and a previous states.

Below are tables listing the actions (i.e. a e A(s)), environment elements, and states (i.e. s∈S) of the various agricultural vehicles 100 which include a reinforcement learning system. As an example, based on the terrain map and the tractor, the tractor actuates the steering column and steers the tractor to a different orientation. Beneficial changes in the orientation—e.g., away from poor field conditions in afield 1000—result in the reinforcement learning system associating the change with a reward r. The rewards can be any numerical representation of the combine working towards its goal.

| Tractor<br>Action—A(s) | Environment<br>Element | States—S |
|---|---|---|
| Steering | Terrain Map | Tractor GPS |
| Tire Pressure | Implement Ballasting | Implement GPS |
| Engine RPM | Tire/Track Selection | Movement Conditions |
| Implement Ballasting | | Hydraulic Conditions |
| Gear Selection | | Spool position |
| Hydraulic Valve Position | | |
| Hydraulic Pressure | | |
| Pump spooling | | |
| Proportional flow rate | | |

| Sprayer<br>Actions—A(s) | Environment<br>Element | States—S |
|---|---|---|
| Change Nozzle Opening | Wind Speed | Spray Amount |
| Agitate | Terrain Map | Spray Speed |
| Air Pressure | Field Map | Pressure |
| Boom height | Terrain Preparation | Agitation level |
| Solenoid Energize/De-energize | Obstacles | Flow Rate |
| Valve Open/Close Speed | | Line Pressure |

| Seeder<br>Actions—A(s) | Environment<br>Element | States—S |
|---|---|---|
| Metering | Seed Size | Soil Makeup (clay, silt, sand) |
| Drive Seed | Seed Variety | Seed Placement |
| Fan Speed | Field Map | Seed Depth |
| Metering Drive Fertilizer | Terrain Map | Seed Spacing/Population |
| Flow Control (by row) | Terrain Preparation | Fertilizer Deficiency |

In one example, the agent 340 is executing a model 342 that is not actively being trained using the reinforcement techniques. In this case, the agent can be a model that was independently trained using the actor-critic methods. That is, the agent is not actively rewarding connections in the neural network. The agent can also include various models that have been trained to optimize different performance metrics of the vehicle 100. The user of the vehicle 100 can select between performance metrics to optimize, and thereby change the models, using the operator interface 238 of the control system 201.

In other examples, the agent can be actively training the model 342 using reinforcement techniques. In this case, the model 342 generates a reward vector including a weight function that modifies the weights of any of the connections included in the model 342. The reward vector can be configured to reward various metrics including the performance of the vehicle 100 as a whole, reward a state, reward a change in state, etc. In some examples, the user of the vehicle 100 can select which metrics to reward using the operator interface 238 of the control system 201.

Figure 10:
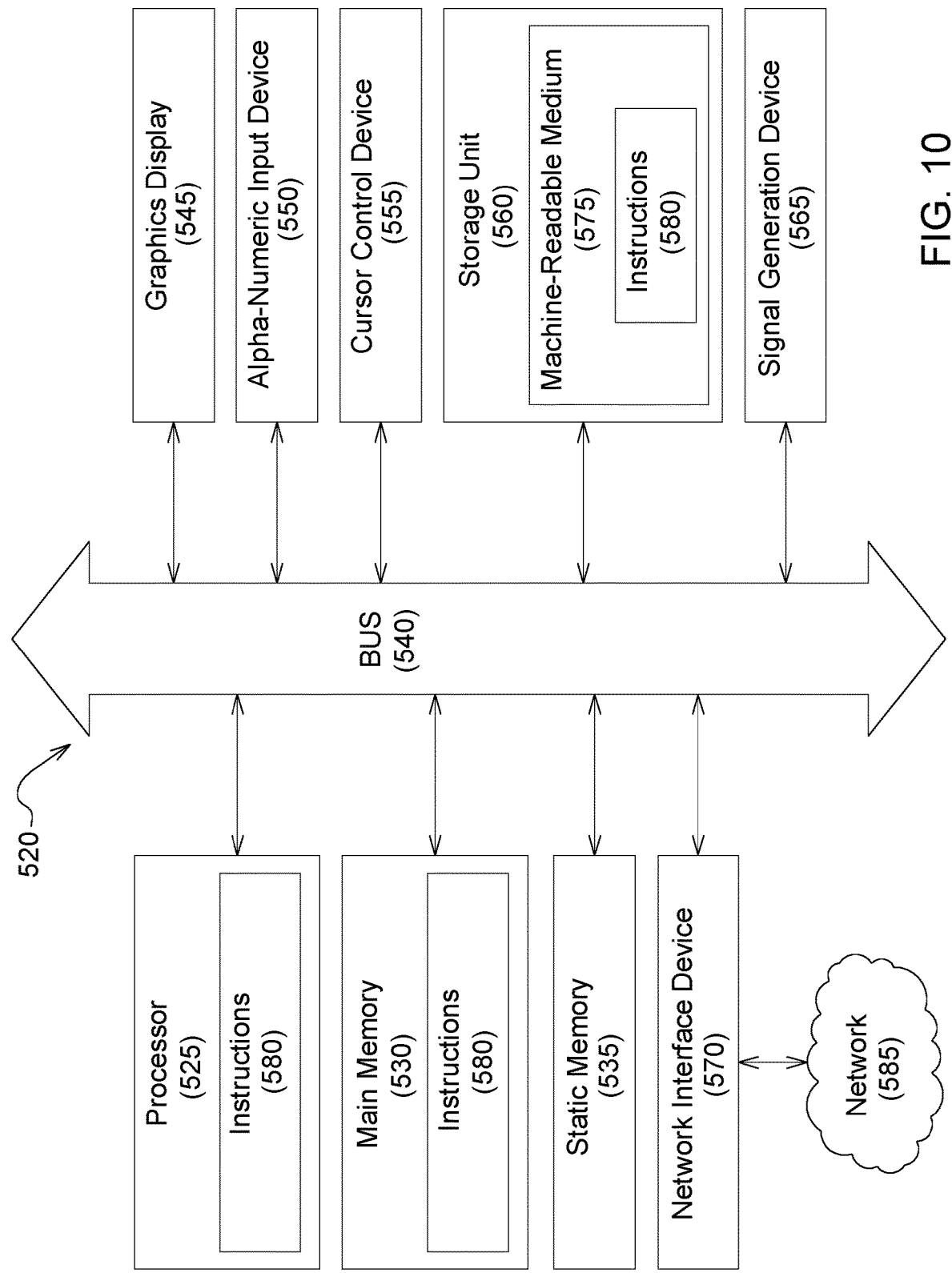
FIG. 10 is a block diagram illustrating components of an example agricultural vehicle for reading and executing instructions from a machine-readable medium

FIG. 10 is a block diagram illustrating components of an example machine for reading and executing instructions from a machine-readable medium. Specifically, FIG. 10 shows a diagrammatic representation of network system 310 and control system 201 in the example form of a computer system 520. The computer system 520 can be used to execute instructions 580 (e.g., program code or software) for causing the machine to perform any one or more of the methodologies (or processes) described herein. In alternative examples, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 580 (sequential or otherwise) that specify actions to be taken by that machine. Further, while only a single machine is illustrated, the term "machine" shall also be taken to include any collection of machines that individually or jointly execute instructions 580 to perform any one or more of the methodologies discussed herein.

The example computer system 520 includes one or more processing units (generally processor 525). The processor 525 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 520 also includes a main memory 530. The computer system may include a storage unit 560. The processor 525, memory 530, and the storage unit 560 communicate via a bus 540.

In addition, the computer system 520 can include a static memory 535, a graphics display 545 (e.g., to drive a plasma display panel (PDP), a liquid crystal display (LCD), or a projector). The computer system 520 may also include alphanumeric input device 550 (e.g., a keyboard), a cursor control device 555 (e.g., a mouse, a trackball, a joystick, a motion sensor, or other pointing instrument), a signal generation device 565 (e.g., a speaker), and a network interface device 570, which also are configured to communicate via the bus 540.

The storage unit 560 includes a machine-readable medium 575 on which is stored instructions 580 (e.g., software) embodying any one or more of the methodologies or functions described herein. For example, the instructions 580 may include the functionalities of modules of the control system 201 described in FIG. 2. The instructions 580 may also reside, completely or at least partially, within the main memory 530 or within the processor 525 (e.g., within a processor's cache memory) during execution thereof by the computer system 520, the main memory 530 and the processor 525 also constituting machine-readable media. The instructions 580 may be transmitted or received over a network 585 via the network interface device 570.

Figure 11:
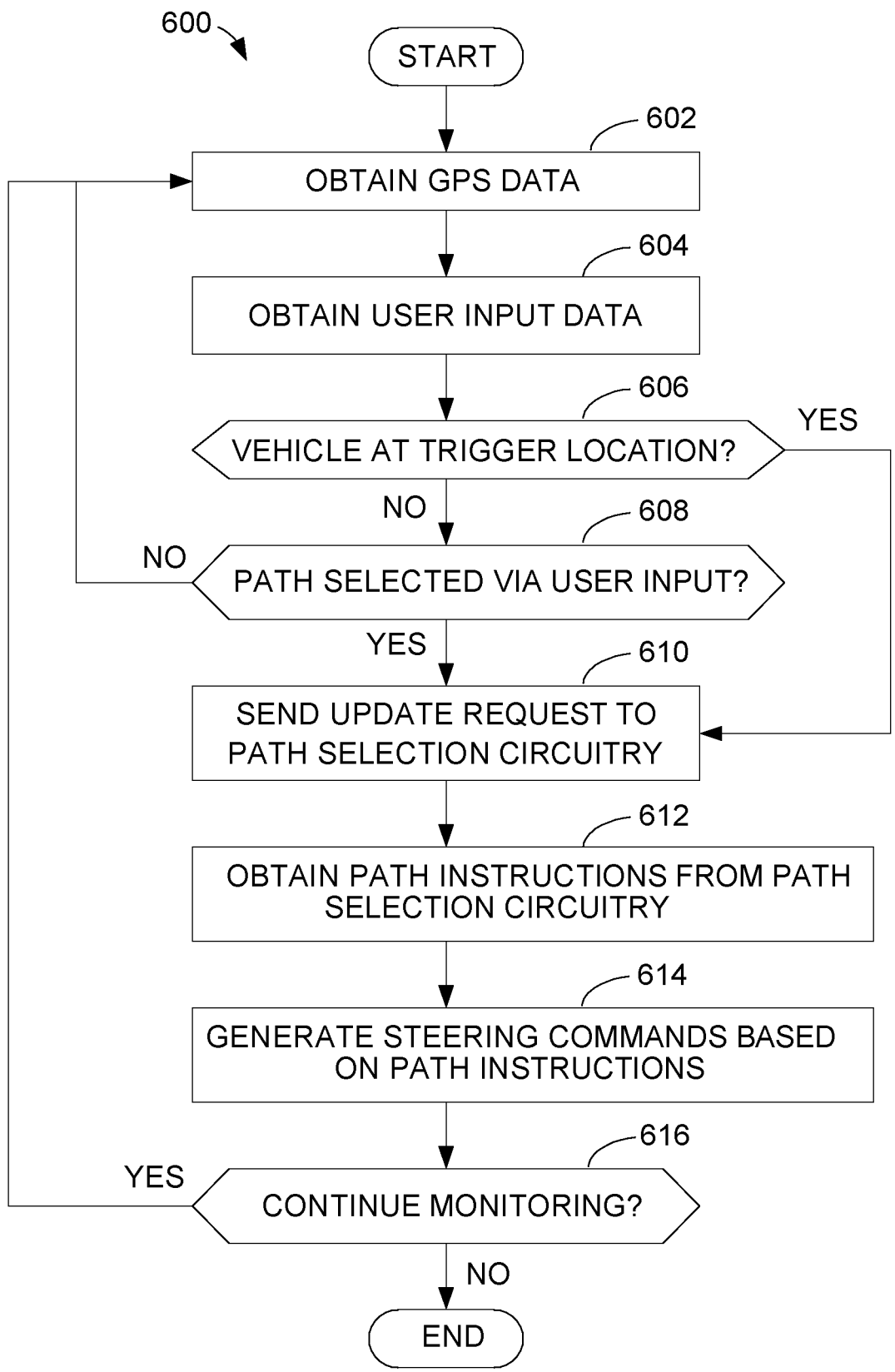
FIG. 11 is a flowchart representative of machine-readable instructions that may be executed to implement the example controller circuitry.

FIG. 11 is a flowchart representative of example machine-readable instructions and/or example operations 600 that may be executed and/or instantiated by the circuitry of control system 201 to control the agricultural vehicle 100. The machine-readable instructions and/or operations 900 of FIG. 11 begin at block 902, at which the example control system 201 obtains GPS data from the vehicle 100. For example, the example vehicle 100 receives and/or otherwise obtains the GPS data collected by the GPS receiver 30*a*. In some examples, the controller determines a current location of the vehicle 100 based on the GPS data. At block 904, the example controller obtains user input data from the vehicle 100. For example, the controller receives and/or otherwise obtains the user input data from the user interface 238. In some examples, the user input data includes one or more paths and/or identifiers of the one or more paths selected by an operator of the vehicle 100 via the user interface 238, and/or includes a request to select a new guidance path 200 for the vehicle 100.

At block 906, the example controller determines whether the vehicle 100 is at a trigger location. For example, a trigger monitoring circuitry determines, based on the current location of the vehicle 100, whether the vehicle 100 is at the trigger location (e.g., at stop point 204, at a midpoint of the current guidance path 200 of the vehicle 100, etc.). In response to the trigger monitoring circuitry determining that the vehicle 100 is at the trigger location (e.g., block 906 returns a result of YES), control proceeds to block 610. Alternatively, in response to the trigger monitoring circuitry determining that the vehicle 100 is not at the trigger location (e.g., block 906 returns a result of NO), control proceeds to block 908.

At block 908, the example control system 201 determines whether a path is selected via user input. For example, the trigger monitoring circuitry determines, based on the user input data, whether the operator of the vehicle 100 has selected and/or otherwise claimed a path via the user interface 238. In response to the trigger monitoring circuitry determining that a path has been selected via user input (e.g., block 908 returns a result of YES), control proceeds to block 610. Alternatively, in response to the trigger monitoring circuitry determining that a path has not been selected via user input (e.g., block 908 returns a result of NO), control returns to block 602.

At block 610, the example control system 201 sends one or more update requests to the example path selection circuitry. For example, network interface circuitry sends the update request to the example path selection circuitry via a network, where the update request includes the current location of the vehicle 100 and/or the user input data. In some examples, the update request includes a request to select a new path for the vehicle 100. In other examples, the update request includes one or more paths and/or identifiers of the one or more paths claimed by the operator of the vehicle 100 via the user interface 238.

At block 612, the example control system 201 obtains the example path instructions from the example path selection circuitry. For example, the network interface circuitry receives and/or otherwise obtains the path instructions from the path selection circuitry, where the path instructions include updated path and/or coverage maps. In some examples, the path instructions include identifiers of one or more claimed paths to be traversed by the vehicle 100, where the one or more claimed paths are selected manually (e.g., via the user interface 238) and/or selected via the path selection circuitry based on the current location of the vehicle 100.

At block 614, the example control system 201 generates the example steering commands based on the example path instructions. For example, the example steering control circuitry determines, based on the path instruction, one or more paths (e.g., current and/or claimed paths) to be traversed by the vehicle 100, and generates the steering commands to steer the vehicle 100 along the one or more paths.

At block 616, the example control system 201 determines whether to continue monitoring steering of the vehicle 100. For example, the vehicle data interface circuitry determines whether to continue monitoring based on whether there are one or more available paths in the path map and/or the coverage map. In response to the vehicle data interface circuitry determining to continue monitoring (e.g., block 616 returns a result of YES), control returns to block 602. Alternatively, in response to the vehicle data interface circuitry determining not to continue monitoring (e.g., block 616 returns a result of NO), control ends.

Figure 12:
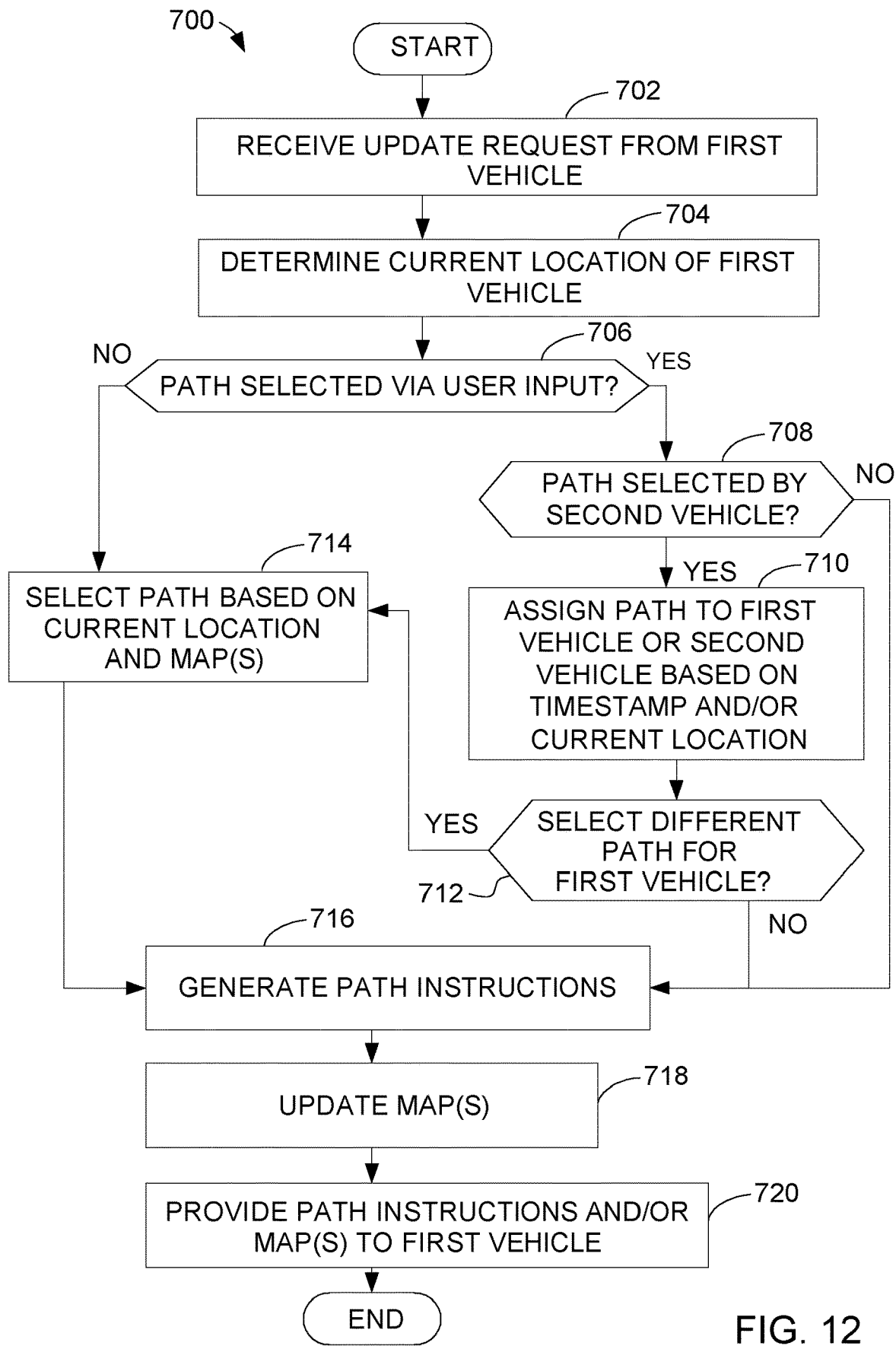
FIG. 12 is a flowchart representative of machine-readable instructions that may be executed to implement the example guidance path selection.

A flowchart representative of example hardware logic circuitry, machine-readable instructions, hardware implemented state machines, and/or any combination thereof for implementing the path selection circuitry is shown in FIG. 12. The machine-readable instructions may be one or more executable programs or portion(s) of an executable program for execution by processor circuitry, such as the processor circuitry 912 shown in the example processor platform 900 discussed below in connection with FIG. 14 and/or the example processor circuitry discussed below in connection with FIGS. 11 and/or 12. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 12, many other methods of implementing the example path selection circuitry may alternatively be used. For example, the order of execution of the blocks may be changed, and/or some of the blocks described may be changed, eliminated, or combined. Additionally, or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

FIG. 12 is a flowchart representative of example machine-readable instructions and/or example operations 700 that may be executed and/or instantiated by the path selection circuitry. The machine-readable instructions and/or operations 700 of FIG. 12 begin at block 702, at which the example path selection circuitry receives the update requests from the first vehicle 100. For example, the example input interface circuitry receives and/or otherwise obtains the update request from the control system 201.

At block 704, the example path selection circuitry determines a current location of the first vehicle 100. For example, the example input interface circuitry determines the current location of the first vehicle 100 based on vehicle data obtained from the update request.

At block 706, the example path selection circuitry determines whether a path has been selected via user input. For example, the example input interface circuitry determines, based on the update request, whether a path has been selected and/or otherwise claimed by an operator of the first vehicle via the user interface 238. In response to the input interface circuitry determining that a path has been selected via user input (e.g., block 706 returns a result of YES), control proceeds to block 708. Alternatively, in response to the input interface circuitry determining that a path has not been selected (e.g., block 706 returns a result of NO), control proceeds to block 714.

At block 708, the example path selection circuitry determines whether the path has been selected by a different vehicle. For example, in response to the example conflict management circuitry determining that the path is selected and/or otherwise claimed by the second vehicle (e.g., block 708 returns a result of YES), control proceeds to block 710. Alternatively, in response to the conflict management circuitry determining that the path is not selected by the second vehicle (e.g., block 708 returns a result of NO), control proceeds to block 716.

At block 710, the example path selection circuitry assigns the selected path to the first vehicle or the second vehicle based on timestamps associated with the update requests and/or based on current locations of the first and second vehicles. For example, the conflict management circuitry obtains a first timestamp from a first one of the update requests associated with the first vehicle and obtains a second timestamp from a second one of the update requests associated with the second vehicle. In such examples, the conflict management circuitry assigns the selected path to the first vehicle or the second vehicle corresponding to an earlier one of the first timestamp or the second timestamp. In other examples, the example distance calculation circuitry calculates a first distance between the selected path and a current location of the first vehicle and calculates a second distance between the selected path and a current location of the second vehicle. In such examples, the conflict management circuitry assigns the selected path to the first vehicle or the second vehicle corresponding to a lesser one of the first distance or the second distance.

At block 712, the example path selection circuitry determines whether to select a different path for the first vehicle. For example, the conflict management circuitry determines a different path is to be selected for the first vehicle when the selected path is assigned to the second vehicle. In response to the conflict management circuitry determining that a different path is to be selected for the first vehicle (e.g., block 712 returns a result of YES), control proceeds to block 714. Alternatively, in response to the conflict management circuitry determining that a different path is not to be selected for the first vehicle (e.g., block 712 returns a result of NO), control proceeds to block 716.

At block 714, the example path selection circuitry selects a new path for the first vehicle based on the current location of the first vehicle and based on one or more maps stored in the example map database. For example, the example path instruction generation circuitry identifies available paths based on information from a path map and/or a coverage map stored in the map database. In some examples, the distance calculation circuitry calculates distances between the current location of the first vehicle and the available paths, and the path instruction generation circuitry selects a path from the available paths that corresponds to a smallest one of the calculated distances.

At block 716, the example path selection circuitry generates the example path instructions. For example, the path instruction generation circuitry generates the path instructions to include the selected path and/or an identifier of the selected path for the first vehicle.

At block 718, the example path selection circuitry updates the one or more maps stored in the example map database. For example, the example update circuitry updates the path map to indicate that the selected path is claimed by the first vehicle. Furthermore, the update circuitry updates the coverage map to indicate than coverage corresponding to the selected path is claimed by the first vehicle. In some examples, the update circuitry further updates the path map and/or the coverage map to include the current location of the first vehicle.

At block 720, the example path selection circuitry provides the path instructions and/or the one or more maps to the first vehicle. For example, the path instruction generation circuitry provides the path instructions to the first control system 201 for use in steering the first vehicle. In some examples, the path instruction generation circuitry also provides the updated path map and/or the updated coverage map in the path instructions to the first vehicle.

Figure 13:
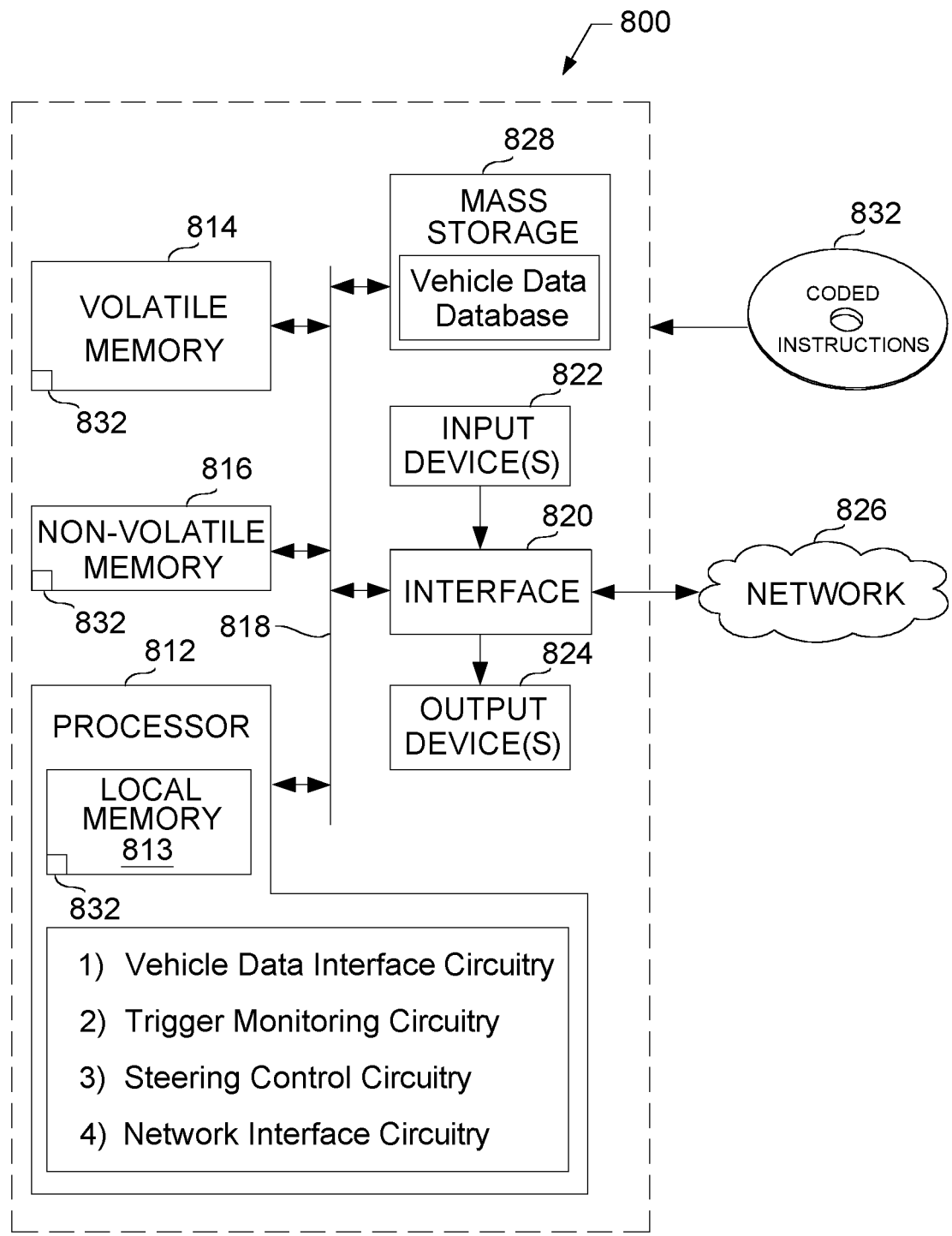
FIG. 13 is a block diagram of an example processing platform structured to execute the instructions of FIG. 11 to implement the example controller circuitry.

FIG. 13 is a block diagram of an example processor platform 800 structured to execute and/or instantiate the machine-readable instructions and/or operations of FIG. 11 to implement the control system 201. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example vehicle data interface circuitry, the example trigger monitoring circuitry, the example vehicle data database 206, the example steering control circuitry 208, and the example network interface circuitry.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth™ interface, a near field communication (NFC) interface, a PCI interface, and/or a PCIe interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 832, which may be implemented by the machine-readable instructions of FIG. 11, may be stored in the mass storage device 828, in the volatile memory 814, in the non-volatile memory 816, and/or on a removable non-transitory computer readable storage medium such as a CD or DVD.

Figure 14:
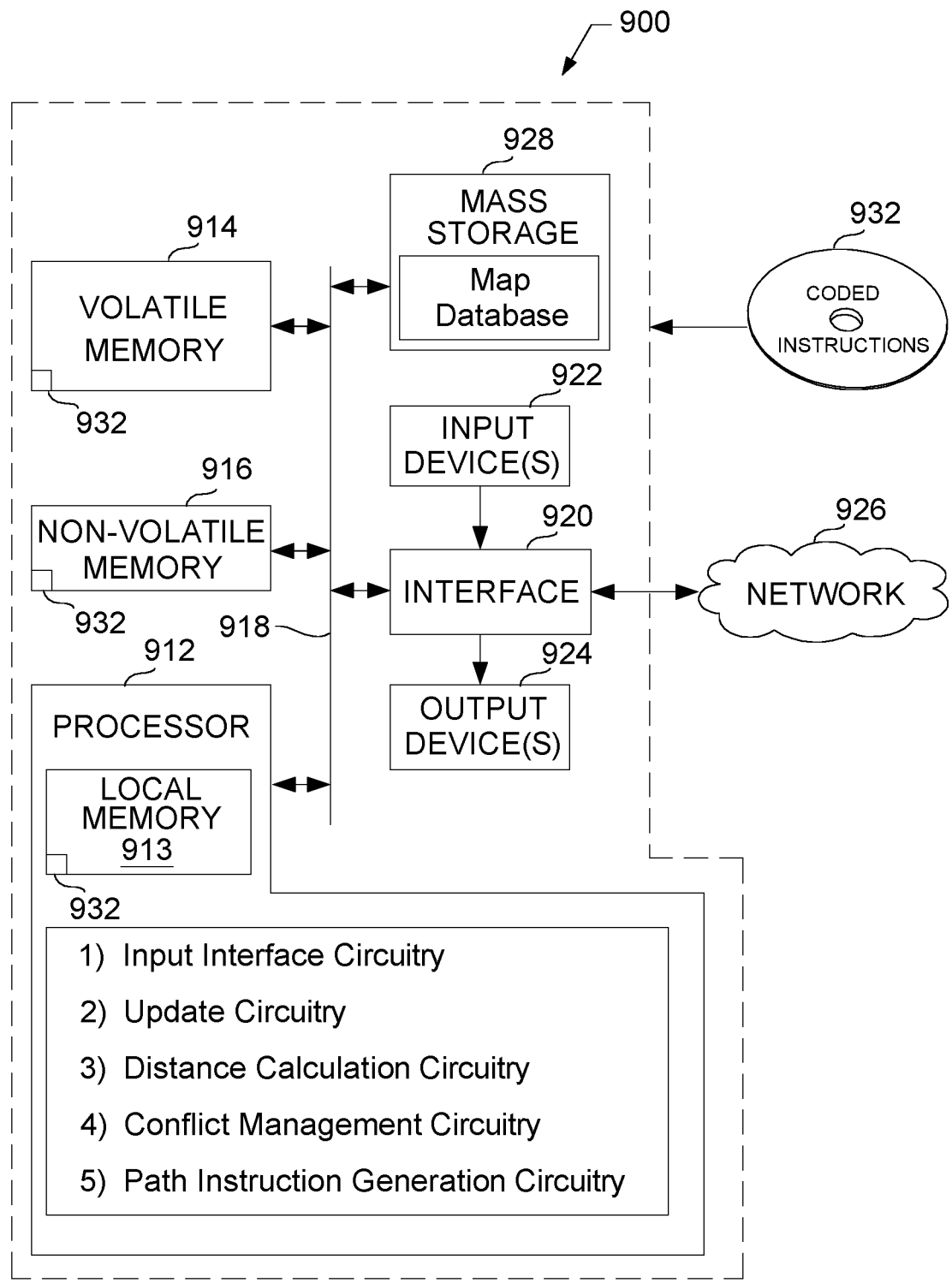
FIG. 14 is a block diagram of an example processing platform structured to execute the instructions of FIG. 12 to implement the example guidance path selection.

FIG. 14 is a block diagram of an example processor platform 900 structured to execute and/or instantiate the machine-readable instructions and/or operations of FIG. 12 to implement the path selection circuitry. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the example input interface circuitry, the example update circuitry, the example distance calculation circuitry, the example conflict management circuitry, the example path instruction generation circuitry, and the example map database.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output devices 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 932, which may be implemented by the machine-readable instructions of FIG. 12, may be stored in the mass storage device 928, in the volatile memory 914, in the non-volatile memory 916, and/or on a removable non-transitory computer readable storage medium such as a CD or DVD.

Figure 15:
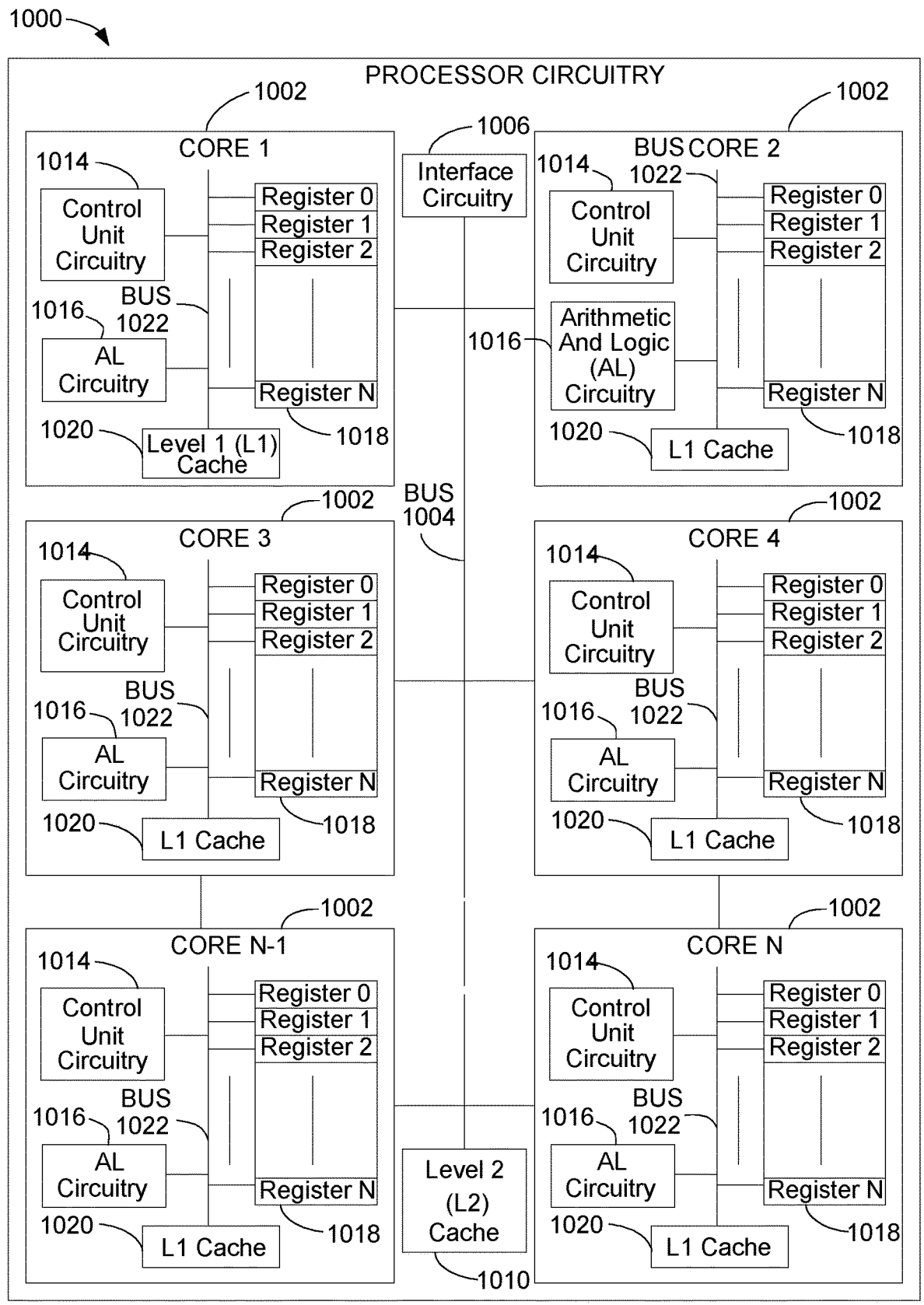
FIG. 15 is a block diagram of an example implementation of the processor circuitry of FIGS. 13 and/or 14.

FIG. 15 is a block diagram of an example implementation of the processor circuitry 812 of FIG. 13 and/or the processor circuitry 912 of FIG. 14. In this example, the processor circuitry 812 of FIG. 13 and/or the processor circuitry 912 of FIG. 14 is implemented by a microprocessor 1000. For example, the microprocessor 1000 may implement multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine-readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine-readable instructions and/or operations represented by the flowcharts of FIGS. 11 and/or 12.

The cores 1002 may communicate by an example bus 1004. In some examples, the bus 1004 may implement a communication bus to effectuate communication associated with one(s) of the cores 1002. For example, the bus 1004 may implement at least one of an Inter-Integrated Circuit (I2C) bus, a Serial Peripheral Interface (SPI) bus, a PCI bus, or a PCIe bus. Additionally, or alternatively, the bus 1004 may implement any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1100 (e.g., Level 1 (L1) cache that may be split into an L1 data cache and an L1 instruction cache), the microprocessor 1000 also includes example shared memory 1010 that may be shared by the cores (e.g., Level 2 (L2_cache)) for high-speed access to data and/or instructions. Data and/or instructions may be transferred (e.g., shared) by writing to and/or reading from the shared memory 1010. The local memory 1100 of each of the cores 1002 and the shared memory 1010 may be part of a hierarchy of storage devices including multiple levels of cache memory and the main memory (e.g., the main memory 814, 816 of FIG. 13 and/or the main memory 914, 916 of FIG. 14). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the L1 cache 1100, and an example bus 1102. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register (s), flag register(s), segment register(s), machine specific register(s), instruction pointer register(s), control register(s), debug register(s), memory management register(s), machine check register(s), etc. The registers 1018 may be arranged in a bank as shown in FIG. 15. Alternatively, the registers 1018 may be organized in any other arrangement, format, or structure including distributed throughout the core 1002 to shorten access time. The bus 1004 may implement at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 16:
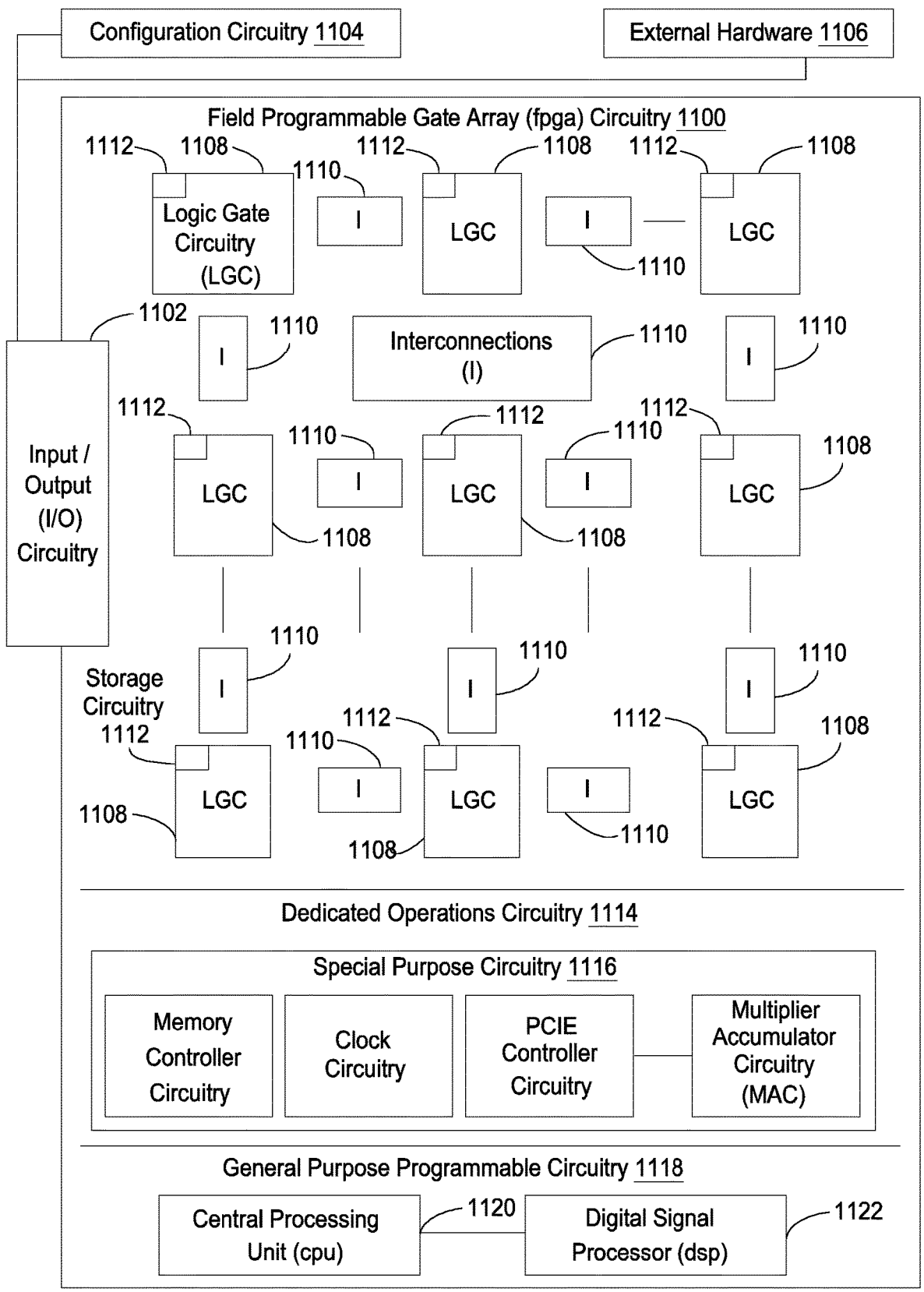
FIG. 16 is a block diagram of another example implementation of the processor circuitry of FIGS. 13 and/or 14.

FIG. 16 is a block diagram of another example implementation of the processor circuitry 812 of FIG. 13 and/or the processor circuitry 912 of FIG. 14. In this example, the processor circuitry 812 and/or the processor circuitry 912 is implemented by FPGA circuitry 1100. The FPGA circuitry 1100 can be used, for example, to perform operations that could otherwise be performed by the example microprocessor 1000 of FIG. 15 executing corresponding machine-readable instructions. However, once configured, the FPGA circuitry 1100 instantiates the machine-readable instructions in hardware and, thus, can often execute the operations faster than they could be performed by a general purpose microprocessor executing the corresponding software.

More specifically, in contrast to the microprocessor 1000 of FIG. 15 described above (which is a general purpose device that may be programmed to execute some or all of the machine-readable instructions represented by the flowcharts of FIGS. 11 and/or 12 but whose interconnections and logic circuitry are fixed once fabricated), the FPGA circuitry 1100 of the example of FIG. 16 includes interconnections and logic circuitry that may be configured and/or interconnected in different ways after fabrication to instantiate, for example, some or all of the machine-readable instructions represented by the flowcharts of FIGS. 11 and/or 12. In particular, the FPGA 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 11 and/or 12. As such, the FPGA circuitry 1100 may be structured to effectively instantiate some or all of the machine-readable instructions of the flowcharts of FIGS. 11 and/or 12 as dedicated logic circuits to perform the operations corresponding to those software instructions in a dedicated manner analogous to an ASIC. Therefore, the FPGA circuitry 1100 may perform the operations corresponding to the some or all of the machine-readable instructions of FIGS. 11 and/or 12 faster than the general purpose microprocessor can execute the same.

In the example of FIG. 16, the FPGA circuitry 1100 is structured to be programmed (and/or reprogrammed one or more times) by an end user by a hardware description language (HDL) such as Verilog. The FPGA circuitry 1100 of FIG. 16, includes example input/output (I/O) circuitry 1110 to obtain and/or output data to/from example configuration circuitry 1104 and/or external hardware (e.g., external hardware circuitry) 1106. For example, the configuration circuitry 1104 may implement interface circuitry that may obtain machine-readable instructions to configure the FPGA circuitry 1100, or portion(s) thereof. In some such examples, the configuration circuitry 1104 may obtain the machine-readable instructions from a user, a machine (e.g., hardware circuitry (e.g., programmed or dedicated circuitry) that may implement an Artificial Intelligence/Machine Learning (A/ML) model to generate the instructions), etc. In some examples, the external hardware 1106 may implement the microprocessor 1100 of FIG. 16. The FPGA circuitry 1100 also includes an array of example logic gate circuitry 1108, a plurality of example configurable interconnections 1110, and example storage circuitry 1112. The logic gate circuitry 1108 and interconnections 1110 are configurable to instantiate one or more operations that may correspond to at least some of the machine-readable instructions of FIGS. 11 and/or 12 and/or other desired operations. The logic gate circuitry 1108 shown in FIG. 16 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 16 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 15 and 16 illustrate two example implementations of the processor circuitry 812 of FIG. 13 and/or the processor circuitry 912 of FIG. 14, many other approaches are contemplated. For example, as mentioned above, modem FPGA circuitry may include an on-board CPU, such as one or more of the example CPU 1120 of FIG. 16. Therefore, the processor circuitry 812 of FIG. 13 and/or the processor circuitry 912 of FIG. 14 may additionally be implemented by combining the example microprocessor 1000 of FIG. 15 and the example FPGA circuitry 1100 of FIG. 16. In some such hybrid examples, a first portion of the machine-readable instructions represented by the flowcharts of FIGS. 11 and/or 12 may be executed by one or more of the cores 1002 of FIG. 15 and a second portion of the machine-readable instructions represented by the flowcharts of FIGS. 11 and/or 12 may be executed by the FPGA circuitry 1100 of FIG. 16.

In some examples, the processor circuitry 812 of FIG. 13 and/or the processor circuitry 912 of FIG. 14 may be in one or more packages. For example, the processor circuitry 1000 of FIG. 15 and/or the FPGA circuitry 1100 of FIG. 16 may be in one or more packages. In some examples, an XPU may be implemented by the processor circuitry 812 of FIG. 13 and/or the processor circuitry 912 of FIG. 14, which may be in one or more packages. For example, the XPU may include a CPU in one package, a DSP in another package, a GPU in yet another package, and an FPGA in still yet another package.

Figure 17:
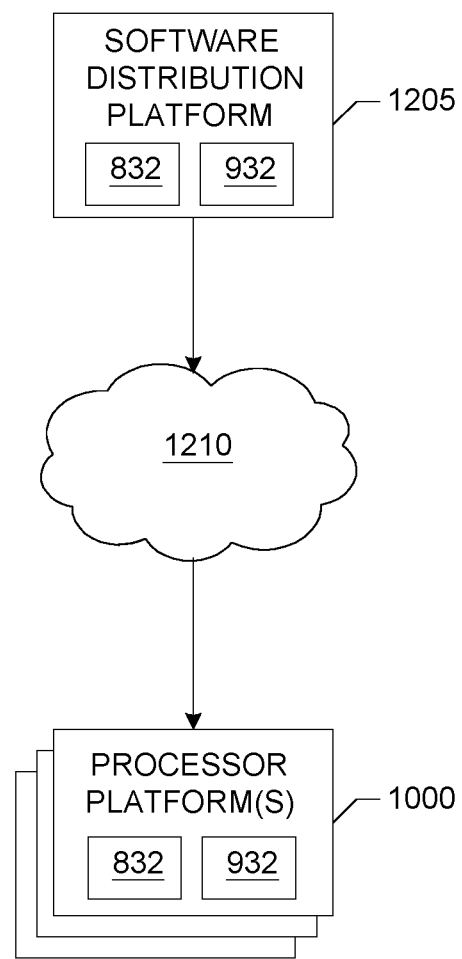
FIG. 17 is a block diagram of an example software distribution platform (e.g., one or more servers) to distribute software (e.g., software corresponding to the example machine-readable instructions of FIGS. 11 and/or 12) to client devices associated with end users.

A block diagram illustrating an example software distribution platform 1205 to distribute software such as the example machine-readable instructions 832 of FIG. 13 and/or the example machine-readable instructions 932 of FIG. 14 to hardware devices owned and/or operated by third parties is illustrated in FIG. 17. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine-readable instructions 832 of FIG. 13 and/or the example machine-readable instructions 932 of FIG. 14. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine-readable instructions 832 of FIG. 13 and/or the example machine-readable instructions 932 of FIG. 14.

The one or more servers of the example software distribution platform 1205 are in communication with a network 1210, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine-readable instructions 832 and/or the example machine-readable instructions 932 from the software distribution platform 1205. For example, the software, which may correspond to the example machine-readable instructions 832 of FIG. 13 and/or the example machine-readable instructions 932 of FIG. 14, may be downloaded to the example processor platform 800 and/or the example processor platform 900, which is/are to execute the machine-readable instructions 832 and/or the machine-readable instruction 932 to implement the control system 201 of FIG. 2 and/or the path selection circuitry. In some example, one or more servers of the software distribution platform 1205 periodically offer, transmit, and/or force updates to the software (e.g., the example machine-readable instructions 832 of FIG. 13 and/or the example machine-readable instructions 932 of FIG. 14) to ensure improvements, patches, updates, etc., are distributed and applied to the software at the end user devices.

Additional Method for Controlling An Agricultural Vehicle

Having described the preferred example, it will become apparent that various modifications can be made without departing from the scope of the invention as defined in the accompanying claims. A method for controlling the actuation mechanisms of a plurality of components of an agricultural vehicle, the method comprising: determining a state vector comprising a plurality of state elements, each of the state elements representing a measurement a state of a subset of the components of the agricultural vehicle, each of the components controlled by an actuation control system communicatively coupled to a control system on the agricultural vehicle; inputting, using the computer, the state vector into a control model to generate an action vector comprising a plurality of action elements for the agricultural vehicle, each of the action elements specifying an action to be taken by the agricultural vehicle in the field, the actions, in aggregate, predicted to achieve improved performance for the agricultural vehicle; and actuating a subset of actuation controllers to execute the actions in the field on the action vector, the subset of actuation controllers changing a configuration of the subset of components such that the state of the agricultural vehicle changes.

In this method, the control model comprises a function representing the relationship between the state vector received as an input to the control model and the action vector generated as an output to the control model, and the function is a model trained using reinforcement learning to reward actions that improve the performance of the agricultural vehicle. In this method, the control model comprises an artificial neural network comprising: a plurality of neural nodes including a set of input nodes for receiving an input to the artificial neural network and a set of output nodes for outputting an output to the artificial neural network, where each neural node represents a sub-function for determining an output for the artificial neural network from the input of the artificial neural network, and each input node is connected to one or more output nodes by a connection of a plurality of weighted connections; and a function configured to generate actions for the agricultural vehicle which improve the agricultural vehicle performance, the function defined by the sub-functions and weighted connections of the artificial neural network.

Further, in this method each state element of the state vector is connected to one or more input nodes by a connection of the plurality of weighted connections, each action element of the action vector is connected to one or more output nodes by a connection of the plurality of weighted connections, and the function is configured to generate action elements of the action vector from state elements of the state vector.

Further in this method, the artificial neural network is a first artificial neural network from a pair of similarly configured artificial neural networks acting as an actor-critic pair and used to train the first artificial neural network to generate actions that improve the agricultural vehicle performance.

Further, in this method the first neural network inputs state vectors and values for the weighted connections and outputs action vectors, the values for the weighted connections modifying the function for generating actions for the agricultural vehicle that improve agricultural vehicle performance, and the second neural network inputting a reward vector and a state vector and outputting the values for the weighted connections, the reward vector comprising elements signifying the improvement in performance of the agricultural vehicle from a previously executed action.

Further in this method, the elements of the reward vector are determined using measurements of the capabilities of a subset the components of the agricultural vehicle that were previously actuated based on the previously executed action.

Further in this method, the operator can select a metric for performance improvement, the metrics including rate at which field conditions are determined, time required to determine field conditions, accuracy of predicted machine sink, accuracy of predicted field conditions and number of alternative travel paths.

Further in this method, the state vectors are obtained from plurality of agricultural vehicles taking a plurality of actions from a plurality of action vectors to perform field operations in a field.

Further in this method, the state vectors and action vectors are simulated from a set of seed state vectors obtained from a plurality of agricultural vehicles taking a set of actions from a seed set of action vectors to perform field operations in a field.

Further in this method, determining a state data vector comprises: accessing a datastream communicatively coupling a plurality of sensors, each sensor for providing a measurement of one of the capabilities of a subset of the components of the agricultural vehicle; and determining the elements of the state vector based on the measurements included in the datastream.

Further in this method, the plurality of sensors can include at least one of a vision system, ground penetrating radar, a load sensor, a GPS receiver and an inertial motion unit.

Further in this method, actuation of a subset of actuation controllers comprises: determining a set of machine instructions each actuation controller of the subset such that the machine instructions change the configuration of each component when received by the actuation controller; accessing a datastream communicatively coupling the actuation controllers; and sending the set of machine instructions to each actuation controller of the subset via the datastream.

Further in this method, the action elements can specify actions including any of: modifying a speed of the agricultural vehicle; modifying a travel path of the agricultural vehicle; and changing the position of the agricultural vehicle relative to the field.

Further in this method, the action elements of the action vector are numerical representation of the action.

Further in this method, the state elements of the state vector are a numerical representation of the measurements.

Additional Examples

Although the vehicle 100 is shown as a sugarcane harvester, the system described above is also suitable for use with other agricultural vehicles such as tractor, sprayer or other implements having interacting and complex adjustments to accommodate various types of continually changing operating conditions. For example, the control system 201 may communicate projections and/or other data to one or more agricultural machines or devices to assist with controlling the one or more machines or agricultural devices in accordance with the communicated data.

In one example, the control system 201 may be comprised of one or more of software and/or hardware in any proportion. In such an example, control system 201 may reside on a computer-based platform such as, for example, a server or set of servers. Any such server or servers may be a physical server(s) or a virtual machine(s) executing on another hardware platform or platforms. Any server, or for that matter any computer-based system, systems or elements described herein, will be generally characterized by one or more controllers and associated processing elements and storage devices communicatively interconnected to one another by one or more busses or other communication mechanism for communicating information or data. In one example, storage within such devices may include a main memory such as, for example, a random access memory (RAM) or other dynamic storage devices, for storing information and instructions to be executed by the controller(s) and for storing temporary variables or other intermediate information during the use of the controller described herein.

In one example, the control system 201 may also include a static storage device such as, for example, read only memory (ROM), for storing static information and instructions for the controller(s). In one example, the control system 201 may include a storage device such as, for example, a hard disk or solid state memory, for storing information and instructions. Such storing information and instructions may include, but not be limited to, instructions to compute, which may include, but not be limited to processing and analyzing field condition data or information of all types. Such data or information may pertain to, but not be limited to, weather, soil type, slope, topography, plant type, plant growth stage, or historical data, future forecast data, economic data associated with a field or field condition or any other type of agricultural data or information.

In one example, the processing and analyzing of data by the control system 201 may pertain to processing and analyzing agronomic factors obtained from externally gathered image data, and issue alerts if so required based on pre-defined acceptability parameters. RAMs, ROMs, hard disks, solid state memories, and the like, are all examples of tangible computer readable media, which may be used to store instructions which comprise processes, methods and functionalities of the present disclosure. Exemplary processes, methods and functionalities of the control system 201 may include determining a necessity for generating and presenting alerts in accordance with examples of the present disclosure. Execution of such instructions causes the various computer-based elements of control system 201 to perform the processes, methods, functionalities, operations, etc., described herein. In some examples, the control system 201 of the present disclosure may include hard-wired circuitry to be used in place of or in combination with, in any proportion, such computer-readable instructions to implement the disclosure.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the systems, methods, processes, apparatuses and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various examples of the systems, apparatuses, devices, methods and/or processes via the use of block diagrams, schematics, flowcharts, examples and/or functional language. Insofar as such block diagrams, schematics, flowcharts, examples and/or functional language contain one or more functions and/or operations, it will be understood by those within the art that each function and/or operation within such block diagrams, schematics, flowcharts, examples or functional language can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative example of the subject matter described herein applies regardless of the signal bearing medium used to carry out the distribution. Examples of a signal bearing medium include, but are not limited to, the following: a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components associated with, comprised of, contained within or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two or more components herein combined to achieve a particular functionality can be seen as "associated with" each other such that the desired functionality is achieved, irrespective of architectures or intermediate components. Likewise, any two or more components so associated can also be viewed as being "operably connected", or "operably coupled", to each other to achieve the desired functionality, and any two or more components capable of being so associated can also be viewed as being "operably couplable", to each other to achieve the desired functionality. Specific examples of operably couplable include, but are not limited to, physically mateable and/or physically interacting components, and/or wirelessly interactable and/or wirelessly interacting components, and/or logically interacting and/or logically interactable components.

Unless specifically stated otherwise or as apparent from the description herein, it is appreciated that throughout the present disclosure, discussions utilizing terms such as "accessing," "aggregating," "analyzing," "applying," "brokering," "calibrating," "checking," "combining," "communicating," "comparing," "conveying," "converting," "correlating," "creating," "defining," "deriving," "detecting," "disabling," "determining," "enabling," "estimating," "filtering," "finding," "generating," "identifying," "incorporating," "initiating," "locating," "modifying," "obtaining," "outputting," "predicting," "receiving," "reporting," "retrieving," "sending," "sensing," "storing," "transforming," "updating," "using," "validating," or the like, or other conjugation forms of these terms and like terms, refer to the actions and processes of a controller, computer system or computing element (or portion thereof) such as, but not limited to, one or more or some combination of: a visual organizer system, a request generator, an Internet coupled computing device, a computer server, etc. In one example, the controller, computer system and/or the computing element may manipulate and transform information and/or data represented as physical (electronic) quantities within the controller, computer system's and/or computing element's processor(s), register(s), and/or memory(ies) into other data similarly represented as physical quantities within the controller, computer system's and/or computing element's memory(ies), register(s) and/or other such information storage, processing, transmission, and/or display components of the computer system(s), computing element(s) and/or other electronic computing device(s). Under the direction of computer-readable instructions, the controller, computer system (s) and/or computing element(s) may carry out operations of one or more of the processes, methods and/or functionalities of the present disclosure.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific examples and applications, persons skilled in the art can, considering this teaching, generate additional examples without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

What is claimed is:

1. A system for identifying field conditions, the system comprising:
    a field condition determination component to use a processor to at least:
        obtain location data indicative of a location of a target site;
        obtain soil data indicative of soil conditions at the target site stored in memory; and
    execute a neural network model to predict a sink index that quantifies an extent to which a vehicle sinks into soil and creates a deep trench when traversing the target site, the predicted sink index based at least on:
        the location data;
        the soil data; and
        equipment identification data indicative of specifications for the vehicle; and
    a display to render a visual representation of the sink index in combination with a map of the target site, the visual representation viewable by an operator of the vehicle.

2. The system of claim 1, wherein the field condition determination component is to obtain weather data indicative of weather at the target site.

3. The system of claim 1, wherein the field condition determination component is to obtain terrain data indicative of terrain at the target site.

4. The system of claim 1, wherein the field condition determination component is to obtain moisture data indicative of soil moisture level at the target site.

5. The system of claim 1, including a field condition analyzing component to generate real-time data indicative of one or more site conditions related to the sink index.

6. The system of claim 5, wherein the field condition analyzing component includes an image sensor that is to use one or more of the following to generate image data:
    a visible light detector;
    an infrared light detector;
    a polarized light detector;
    an electromagnetic wave detector;
    an active acoustic imaging sensor; and
    a laser light detector.

7. The system of claim 5, wherein the field condition analyzing component includes one or more of a ground penetrating radar and a load sensor.

8. The system of claim 5, wherein the field condition analyzing component is to generate real-time data indicative of real-time site conditions related to the sink index based at least on real-time wheel slip data received from one or more wheel slip sensors disposed on the vehicle, and the wheel slip data indicative of an amount of wheel slippage of one or more wheels of the vehicle.

9. The system of claim 5, wherein the field condition analyzing component is to generate real-time data indicative of real-time site conditions related to the sink index based at least on real-time force data received from a force sensor disposed on the vehicle, the real-time data to include downforce data that is indicative of an amount of downforce and/or draft force applied by a piece of towed equipment to the vehicle.

10. The system of claim 5, wherein the field condition analyzing component is to generate an alert signal indicating a real-time alert to the operator in response to the real-time data indicating a pre-determined machine sink threshold is not met for the vehicle.

11. The system of claim 5, including a machine sink updating component that is to perform one or more of:
automatically update the visual representation with update data based at least upon the real-time data indicative of real-time site conditions related to the sink index; and
provide update data to the neural network model to provide for site condition learning.

12. The system of claim 1, including a site machine sink management component to identify a pre-determined path for the vehicle to traverse based at least upon the sink index and the map of the target site.

13. The system of claim 12, including an autonomous vehicle sub-system that is to autonomously operate the vehicle in accordance with the pre-determined path.

14. A system for identifying machine sink, the system comprising:
one or more sensors disposed on target equipment, the one or more sensors detecting one or more site conditions at a target site in real-time and generating site condition data indicative of the one or more site conditions related to machine sink at the target site;
a field condition determination component using a processor to execute a neural network model and predict, in real-time, a sink index based at least upon the site condition data, the sink index to quantify an extent to which the target equipment sinks into soil and creates a deep trench when traversing the target site;
a machine sink map generation component generating a machine sink map of the target site for the target equipment based at least on the sink index; and
a display receiving the machine sink map to render a visual representation of the machine sink map of the target site viewable by an operator of the target equipment.

15. The system of claim 14, wherein the one or more sensors include a soil saturation sensor that detects an amount of water present in the soil at the target site.

16. The system of claim 14, wherein the one or more sensors include an image sensor that detects soil conditions based at least on image data.

17. The system of claim 14, wherein the machine sink map generating component is to generate the machine sink map based at least on:
the site condition data; and
equipment identification data indicative of target equipment specifications for traversing the target site.

18. The system of claim 17, wherein the one or more sensors are to generate the site condition data based at least on:
location data indicative of a location of the target site; and
soil data indicative of soil conditions at the target site.

19. The system of claim 14, including an autonomous vehicle subs-system that is to autonomously operate the target equipment in accordance with a pre-determined path for the target equipment to traverse based at least upon the machine sink map.

20. A property machine sink management system for managing use of a vehicle, the system comprising:
a machine sink management component used to identify appropriate times and locations for the vehicle to operate at respective one or more target sites based at least on a machine sink map that includes the one or more target sites;
a machine sink map generation component that generates the machine sink map based at least on:
sink indices for the respective one or more target sites;
real-time machine sink data for at least one of the one or more target sites; and
equipment identification data indicative of the vehicle;
a field condition determination component using a processor to execute a neural network model to predict the sink indices based at least on:
location data indicative of a location of the one or more target sites; and
soil data indicative of soil conditions at the respective one or more target sites, wherein a sink index within the sink indices quantifies an extent to which the vehicle sinks into soil when traversing one of the one or more target sites; and
a field condition analyzing component including one or more sensors disposed on the vehicle to detect one or more site conditions in real-time, the site conditions related to the sink indices for the at least one of the one or more target sites.

\* \* \* \* \*